United States Patent
Crawford et al.

(10) Patent No.: US 10,965,112 B2
(45) Date of Patent: Mar. 30, 2021

(54) SELF-SEATING DAMPER CLAMP

(71) Applicant: Hubbell Incorporated, Shelton, CT (US)

(72) Inventors: Trisha Danielle Crawford, Pell City, AL (US); Adrian Beau Candelaria, Alabaster, AL (US); Nicole Slawinski, Shelton, CT (US)

(73) Assignee: HUBBELL INCORPORATED, Shelton, CT (US)

( * ) Notice: Subject to any disclaimer, the term of this patent is extended or adjusted under 35 U.S.C. 154(b) by 27 days.

(21) Appl. No.: 16/252,370

(22) Filed: Jan. 18, 2019

(65) Prior Publication Data

US 2019/0229512 A1    Jul. 25, 2019

Related U.S. Application Data

(60) Provisional application No. 62/619,988, filed on Jan. 22, 2018.

(51) Int. Cl.
*H02G 7/14*     (2006.01)
*H02G 3/04*     (2006.01)
*F16F 7/10*     (2006.01)

(52) U.S. Cl.
CPC ............. *H02G 7/14* (2013.01); *F16F 7/10* (2013.01); *H02G 3/0456* (2013.01)

(58) Field of Classification Search
None
See application file for complete search history.

(56) References Cited

U.S. PATENT DOCUMENTS

| | | | | |
|---|---|---|---|---|
| 2,132,319 A | * | 10/1938 | Preiswerk | H02G 7/14 174/42 |
| 2,867,787 A | * | 1/1959 | Nilsson | H01R 11/14 439/803 |
| 3,026,077 A | * | 3/1962 | Peterson | F16L 3/1091 248/63 |
| 3,032,605 A | * | 5/1962 | Gerlach | H02G 7/12 174/128.1 |
| 3,177,542 A | | 4/1965 | James | |
| 3,432,610 A | | 3/1969 | Claren | |
| 3,446,907 A | * | 5/1969 | Bouche | G01M 7/00 174/42 |

(Continued)

OTHER PUBLICATIONS

Hubbell Power Systems Installation Instructions, Fargo (R) 4-R Vibration Dampers; Feb. 17, 2015, 2 pages.

(Continued)

*Primary Examiner* — Binh B Tran
*Assistant Examiner* — Muhammed Azam
(74) *Attorney, Agent, or Firm* — Wissing Miller LLP

(57) ABSTRACT

Damper clamps that can be mounted and secured to utility conductors from remote locations are provided. The damper clamps are configured to be installed from remote locations, such as the ground, by an individual lineman using an extendable reach tool. Initially, the damper clamp is set in an open position where a conductor can be positioned within a seat of the damper clamp and then the damper clamp can be activated so that a keeper is biased toward the seat to temporarily hold the conductor within the seat. The keeper is then tightened to releasably secured to the conductor to the damper clamp.

25 Claims, 35 Drawing Sheets

(56) References Cited

U.S. PATENT DOCUMENTS

| | | | |
|---|---|---|---|
| 3,584,133 A * | 6/1971 | Claren | F16F 7/14 174/42 |
| 3,597,522 A | 8/1971 | Kobayashi | |
| 3,613,104 A * | 10/1971 | Bradshaw | H02G 7/125 174/72 R |
| 3,614,291 A * | 10/1971 | Pullen | G06F 7/52 174/42 |
| 3,644,660 A * | 2/1972 | Dulhunty | H02G 7/14 174/42 |
| 3,662,084 A * | 5/1972 | Smrekar | F16F 7/14 174/42 |
| 3,743,762 A * | 7/1973 | Annas | H02G 7/12 174/146 |
| 3,885,086 A | 5/1975 | Houston | |
| 3,922,566 A | 11/1975 | Kodama et al. | |
| 4,011,397 A * | 3/1977 | Bouche | H02G 7/14 174/42 |
| 4,011,649 A * | 3/1977 | Hawkins | B25B 27/00 29/267 |
| 4,110,553 A * | 8/1978 | Hawkins | H02G 7/14 174/42 |
| 4,167,646 A | 9/1979 | Mathieu | |
| 4,209,659 A * | 6/1980 | Hawkins | H02G 7/14 174/42 |
| 4,259,541 A | 3/1981 | Bouche | |
| 4,385,201 A * | 5/1983 | Nigol | H02G 7/14 174/42 |
| 4,527,008 A | 7/1985 | Hawkins | |
| 4,527,009 A | 7/1985 | Hawkins | |
| 4,554,402 A * | 11/1985 | Hawkins | H02G 7/14 174/42 |
| 4,680,424 A | 7/1987 | Hawkins | |
| 4,700,437 A | 10/1987 | Hoshino | |
| 4,969,616 A * | 11/1990 | Apperson | H02G 7/056 24/135 N |
| 5,293,974 A * | 3/1994 | Bietenhader | B64C 27/001 188/379 |
| 5,362,920 A * | 11/1994 | Richardson, Jr. | H02G 7/125 174/146 |
| 5,371,320 A | 12/1994 | Torok | |
| 5,547,404 A * | 8/1996 | Nellis, Jr. | H01R 4/366 439/786 |
| 5,721,393 A * | 2/1998 | Richardson, Jr. | H02G 7/125 174/146 |
| 5,801,329 A | 9/1998 | Schmidt | |
| 5,936,197 A * | 8/1999 | Katoh | H02G 7/053 174/40 CC |
| 6,008,453 A * | 12/1999 | Richardson, Jr. | H02G 7/125 174/146 |
| 6,201,184 B1 * | 3/2001 | Francedillaois | H02G 7/053 174/40 R |
| 6,325,327 B1 * | 12/2001 | Zoppitelli | B64C 27/001 244/17.27 |
| 6,448,503 B1 * | 9/2002 | Mc Kinnon | H02G 7/12 174/146 |
| 6,774,303 B1 | 8/2004 | Brittain et al. | |
| 6,943,290 B2 | 9/2005 | Dulhunty | |
| 6,979,236 B1 * | 12/2005 | Stanton | H01R 4/5091 439/783 |
| 7,569,769 B2 | 8/2009 | Zaleski | |
| 8,512,070 B2 * | 8/2013 | De France | H01R 4/38 439/479 |
| 8,517,776 B1 * | 8/2013 | Flojo | H01R 4/646 439/108 |
| 9,551,437 B2 | 1/2017 | Defrance | |
| 9,570,897 B2 | 2/2017 | Dobrinski | |
| 10,128,582 B2 * | 11/2018 | Diop | H01R 4/4872 |
| 10,164,356 B2 * | 12/2018 | Diop | H01R 4/12 |
| 10,193,246 B1 * | 1/2019 | White | H01R 4/44 |
| 10,230,181 B2 * | 3/2019 | Krueger | H01R 4/64 |
| 10,618,429 B2 * | 4/2020 | Logan | B60M 1/24 |
| 10,673,152 B2 * | 6/2020 | O'Connell | H01R 11/14 |
| 2003/0188941 A1 * | 10/2003 | Davis | F16F 7/10 188/379 |
| 2004/0035601 A1 * | 2/2004 | Dulhunty | H02G 7/14 174/40 CC |
| 2004/0149474 A1 * | 8/2004 | Brittain | H02G 7/14 174/42 |
| 2010/0012351 A1 * | 1/2010 | Boisclair | H02G 7/12 174/146 |
| 2012/0214355 A1 * | 8/2012 | De France | H01R 4/42 439/807 |
| 2013/0061466 A1 * | 3/2013 | Casenhiser | H02G 7/14 29/825 |
| 2013/0206455 A1 * | 8/2013 | Chan | H02G 7/12 174/154 |
| 2014/0329420 A1 * | 11/2014 | Magno | H01R 4/36 439/803 |
| 2015/0240711 A1 * | 8/2015 | Kanda | F16C 7/00 123/197.3 |
| 2016/0006231 A1 * | 1/2016 | Tufari | H02G 7/125 174/42 |
| 2016/0079745 A1 * | 3/2016 | Quesnel | H02G 7/14 174/42 |
| 2016/0290532 A1 * | 10/2016 | Defrance | F16L 3/1075 |
| 2016/0344174 A1 * | 11/2016 | Murr | H02G 7/14 |
| 2018/0031794 A1 * | 2/2018 | Sakmar | G02B 6/4463 |
| 2018/0316172 A1 * | 11/2018 | Barry | H02G 7/053 |
| 2018/0366932 A1 * | 12/2018 | Aida | F16F 7/1022 |
| 2019/0074111 A1 * | 3/2019 | Pyron | H02G 7/05 |
| 2019/0190171 A1 * | 6/2019 | Rahman | H01R 4/5008 |
| 2019/0229512 A1 * | 7/2019 | Crawford | F16F 7/10 |
| 2019/0363462 A1 * | 11/2019 | O'Connell | H02G 1/02 |

OTHER PUBLICATIONS

Hubbell Power Systems, Inc. Brochure, "Conductor Protection", Mar. 2016, 22 pages.

Hubbell Power Systems, Inc. Brochure, "Fargo 4-R Dampers Advanced Vibration Protection"; Jun. 2006, 4 pages.

Hubbell Power Systems, Inc. Brochure, "Transmission Connectors; Dampers/Spacers Vibration Damper 4R Stockbridge"; Sep. 2006, 3 pages.

Hubbell Power Systems, Inc. Brochure, "Fargo 4-R, Vibration Damper for Transmission Lines"; Apr. 1997, 2 pages.

Preformed Line Products Brochure, Aeolian Vibration, Oct. 2013, 16 pages.

Hubbell Power Systems, Inc. Brochure, "Fargo 4-R, Vibration Damper for Transmission Lines"; Jan. 2005, 2 pages.

International Search Report and Written Opinion mailed in PCT/US19/14335 dated Apr. 15, 2019 (12 pages).

International Preliminary Report on Patentability mailed in corresponding International Application PCT/US2019/014335 dated Aug. 6, 2020.

* cited by examiner

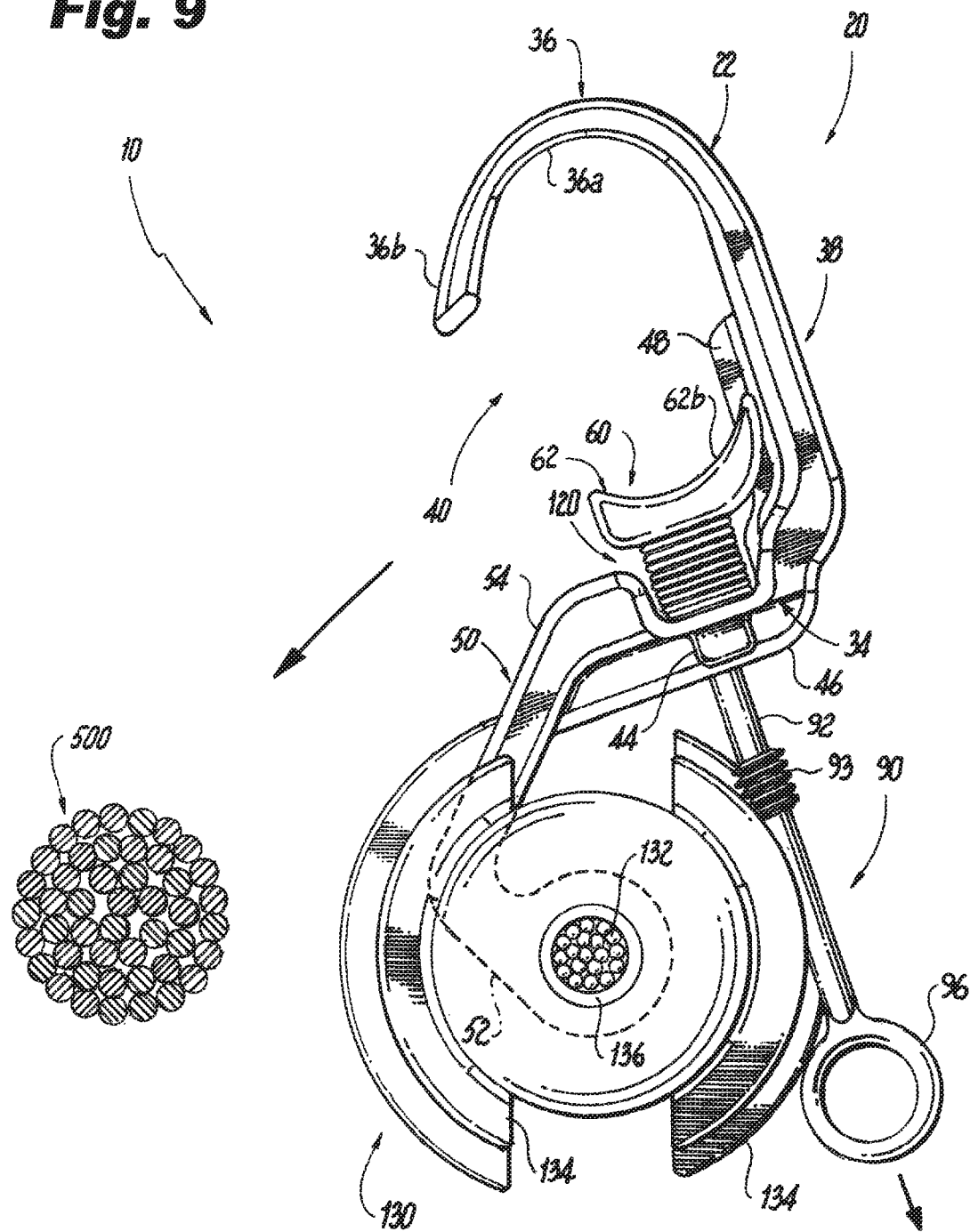

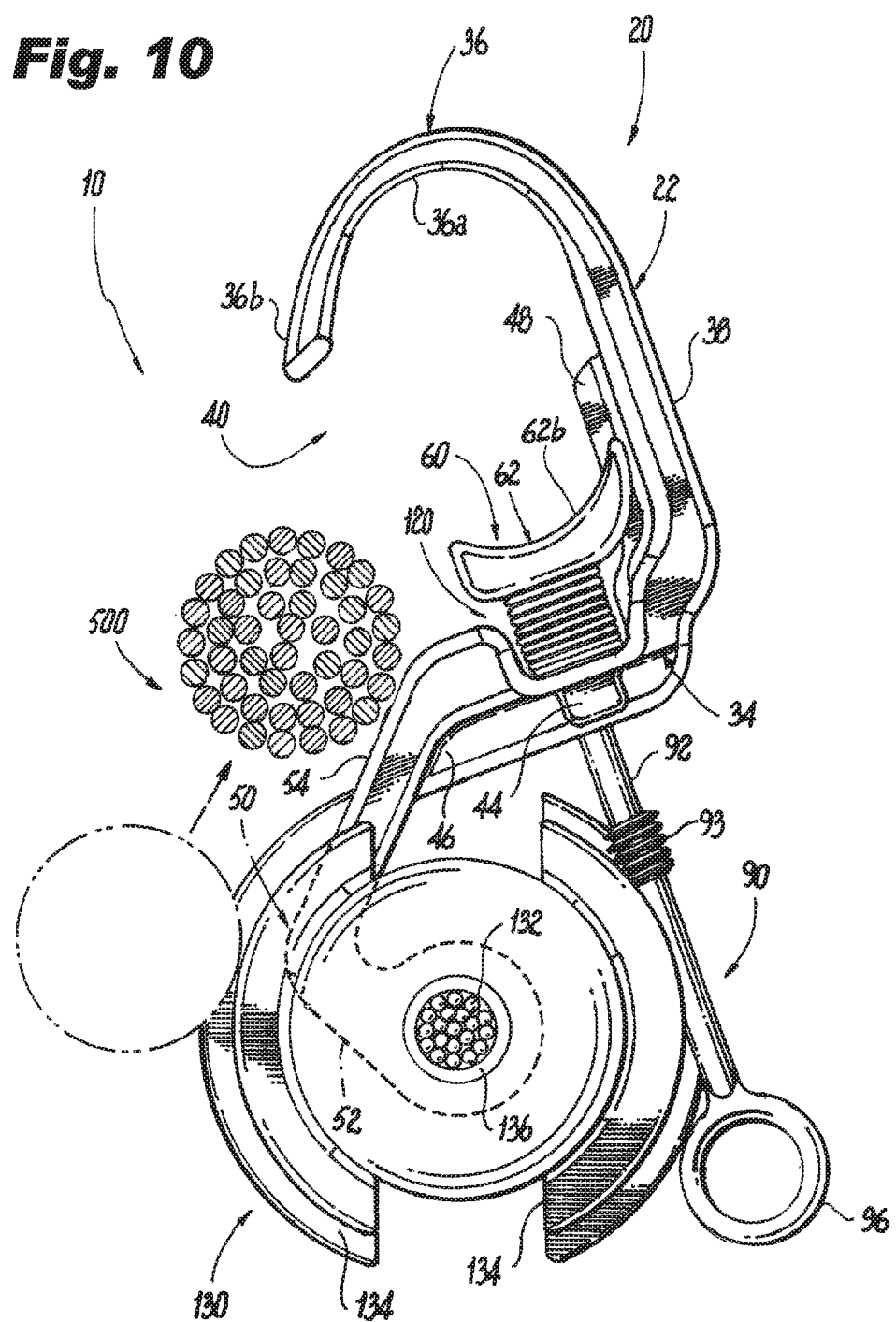

SELF-SEATING DAMPER CLAMP

CROSS REFERENCE TO RELATED APPLICATIONS

The present disclosure is based on and claims benefit from U.S. Provisional Patent Application Ser. No. 62/619,988 filed on Jan. 22, 2018 entitled "Self-Seating Damper Clamp" the contents of which are incorporated herein in their entirety by reference.

BACKGROUND

Field

The present disclosure relates generally to clamps for utility conductors, wires or cables and used to dampen vibrations on such utility conductors, wires or cables. More particularly, the present disclosure relates to damper clamps that can be secured to utility conductors, wires or cables from remote locations.

Description of the Related Art

Vibration dampers are used in the utility industry to dampen vibration, e.g., Aeolian vibration, i.e., high frequency, low amplitude motion associated with smooth non-turbulent winds on utility conductors. Such vibration dampers are also known as cable dampers or damper clamps. Existing damper clamps are currently connected to utility conductors by positioning a seat of a damper clamp over a conductor, positioning a keeper of the damper clamp so that the conductor is sandwiched between the seat and the keeper, and securing the keeper to a body of the damper clamp by tightening a bolt. Existing damper clamps are designed to close around a conductor at an angle relative to the ground causing the installer to hold the damper clamp in place in order to properly position the conductor in the seat of the damper clamp during installation. Due to the need to hold the damper clamp during installation, it is not possible to quickly, safely and cost effectively install a damper clamp remotely using an extendible reach tool. The present disclosure provides a self-seating damper clamp that can be installed from remote locations, e.g., the ground, using an extendible reach tool.

SUMMARY

The present disclosure provides embodiments of damper clamps that can be mounted and secured to utility conductors from remote locations. The damper clamps are configured to be installed from remote locations, such as the ground, by an individual lineman using an extendable reach tool. Initially, the damper clamp is set in an open position where a conductor can be positioned within a seat of the damper clamp and then the damper clamp can be activated so that a keeper is biased toward the seat to temporarily hold the conductor within the seat. The keeper is then tightened to releasably secure the damper clamp to the conductor.

In one exemplary embodiment, the damper clamp includes a clamp assembly and a damper assembly. The clamp assembly includes a body, a stem, a keeper and a spring. The body defines a conductor holding portion and a damper holding portion. The conductor holding portion includes a base having a stem receiving aperture, a seat and a wall between the base and the seat wherein the base, seat and wall define a conductor receiving opening. The stem extends through an aperture in the base and has a keeper coupling member at a first end of the stem, and a tool mounting member at a second end of the stem. The keeper is coupled to the keeper coupling member and is movable between an open position permitting a conductor to be received within the conductor receiving opening and a clamping position where the conductor is clamped between the seat and the keeper. The spring is around the stem between the keeper and the base to normally bias the keeper toward the clamping position to at least temporarily hold the conductor positioned between the seat and the keeper. When the keeper is in the clamping position, rotational movement of the stem is translated to linear movement of the keeper to releasably secure the conductor between the seat and the keeper. The damper assembly is secured to the damper holding portion of the body.

In another exemplary embodiment, the damper clamp includes a body having a conductor holding portion and a damper holding portion. The conductor holding portion of the body includes a conductor receiving opening, a keeper, a stem and a spring. The keeper is positioned within the conductor receiving opening and is movable between an open position permitting a conductor to be received within the conductor receiving opening and a clamping position where the conductor is clamped between the body and a conductor receiving surface of the keeper. The keeper also includes a stem bracket. The stem extends through the body into the conductor receiving opening. The stem has a keeper coupling member coupled to the stem bracket so that the stem is rotatable relative to the keeper. The stem further includes a tool mounting member used to connect the stem to an extendible reach tool. The spring is positioned around the stem between the keeper and the body to normally bias the keeper toward the clamping position to at least temporarily hold a conductor between the keeper and the body. When the keeper is in the clamping position, rotational movement of the stem is translated to linear movement of the keeper to releasably secure the conductor between the keeper and the body.

In another exemplary embodiment, the damper clamp includes a clamp assembly and a damper assembly. The clamp assembly includes a body, a keeper, a stem, and a spring. The body defines a conductor holding portion and a damper holding portion. The conductor holding portion includes a base having a stem receiving aperture, a seat and a wall between the base and the seat. In this configuration, the base, seat and wall define a conductor receiving opening. The keeper includes a pressure plate and a stem bracket extending from the pressure plate. The keeper is movable between an open position permitting a conductor to be received within the conductor receiving opening and a clamping position where the conductor is clamped between the seat and the pressure plate. The stem extends through the stem receiving aperture in the base and has a keeper coupling member at a first end of the stem coupled to the stem bracket or the body. The spring is positioned around the stem between the keeper and the base to normally bias the keeper toward the clamping position to at least temporarily hold the conductor positioned between the seat and the keeper. When the keeper is in the clamping position rotational movement of the stem is translated to linear movement of the keeper to securely tighten the conductor between the seat and the keeper. The damper assembly is secured to the damper holding portion of the body.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 9 is a side elevation view of the damper clamp of FIG. 2, illustrating the damper clamp being aligned for installation on a conductor;

FIG. 10 is a side elevation view of the damper clamp and conductor of FIG. 9, illustrating the conductor being guided along a lead-in of the body of the clamp assembly toward a conductor receiving opening in the clamp assembly;

DETAILED DESCRIPTION

Exemplary embodiments of damper clamps that can be mounted and secured to utility conductors, wires or cables from remote locations by an individual lineman using an extendable reach tool are provided. The size of utility conductors, wires or cables that the damper clamps can be mounted and secured to may range from, for example, about 1431 Kcmils and about 2312 Kcmils. For ease of description, the utility conductors, wires or cables may be referenced as the "conductors" in the plural and as the "conductor" in the singular. The damper clamps dampen vibration, e.g., Aeolian vibration, on the conductors, and are typically installed on the conductor in close proximity to suspension clamps or end terminations of the conductor. Mounting and securing damper clamps to conductors may also be referred to herein as installing the damper clamps.

The damper clamps according to the present disclosure are configured to be installed from remote locations, such as the ground, with a live line extendable reach tool. Non-limiting examples of live line extendable reach tools include hot sticks and shotgun sticks. Initially, a damper clamp is set in an open position where a conductor can be positioned within a seat of the damper clamp and then the damper clamp can be activated so that a keeper is biased toward the seat to temporarily hold the conductor within the seat and then tightened to releasably secure the damper clamp to the conductor.

Figure 1:
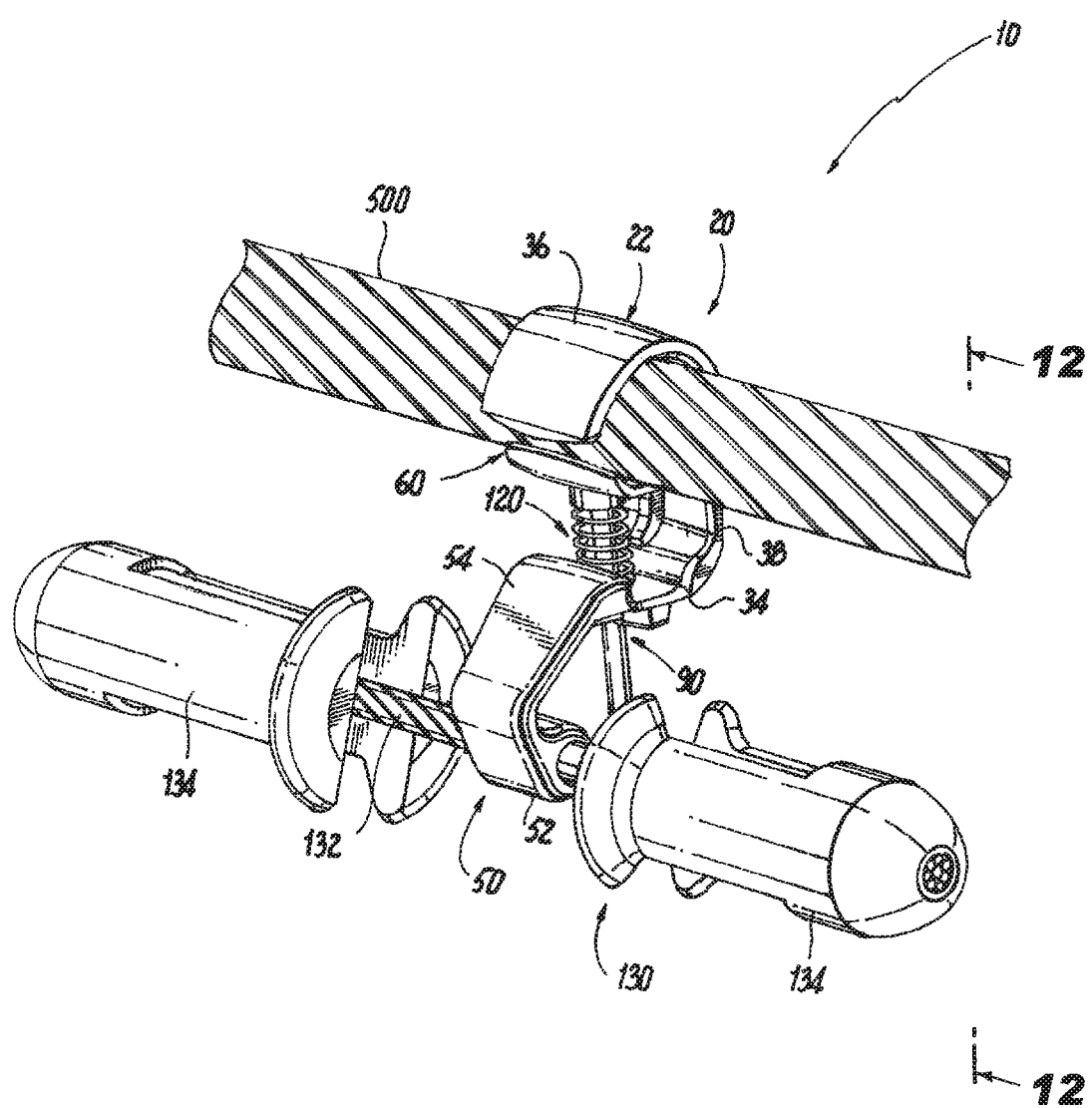
FIG. 1 is a perspective view of an exemplary embodiment of a damper clamp according to the present disclosure releasably secured to a conductor, and illustrating a clamp assembly in a clamping position and a damper assembly extending from the clamp assembly.

Referring now to the figures, in particular FIG. 1, an exemplary embodiment of a damper clamp according to the present disclosure secured to a conductor is shown. The damper clamp 10 includes a clamp assembly 20 and a damper assembly 130. The clamp assembly 20 is configured to be installed on a conductor 500 and the damper assembly 130 is secured to, or integrally or monolithically formed into the clamp assembly 20.

Referring now to FIGS. 2-8, an exemplary embodiment of the clamp assembly 20 of the damper clamp 10 will be described. The clamp assembly 20 has a body 22, a keeper 60, a stem 90 and a spring 120. For general reference purposes, the body 22 has a conductor holding portion 30 and a damper holding portion 32, seen in FIG. 5. The body 22 may be a unitary or monolithic body or may include multiple components secured to each other using, for example, mechanical or adhesive fasteners or welds. For example, the conductor holding portion 30 and a damper holding portion 32 may be formed as a unitary structure, or the conductor holding portion 30 and a damper holding portion 32 may be separate components that are secured together. In the exemplary embodiment shown, the conductor holding portion 30 and a damper holding portion 32 are formed as a monolithic structure.

Figure 5:
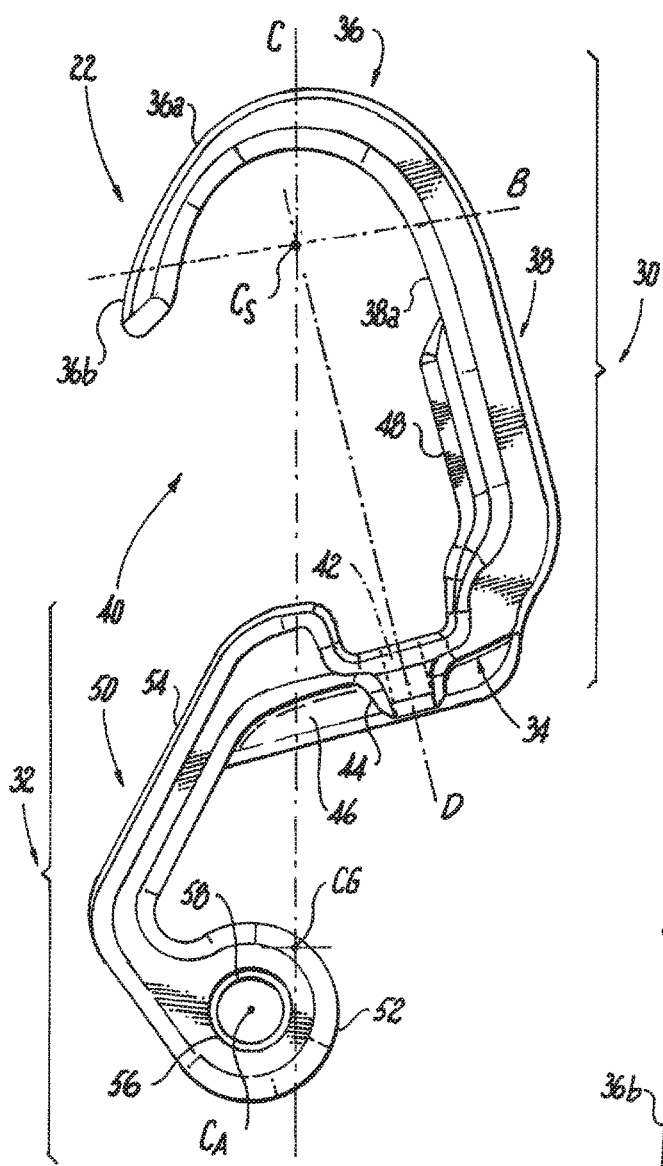
FIG. 5 is a side elevation view of a body of the clamp assembly of FIG. 4.
Figure 6:
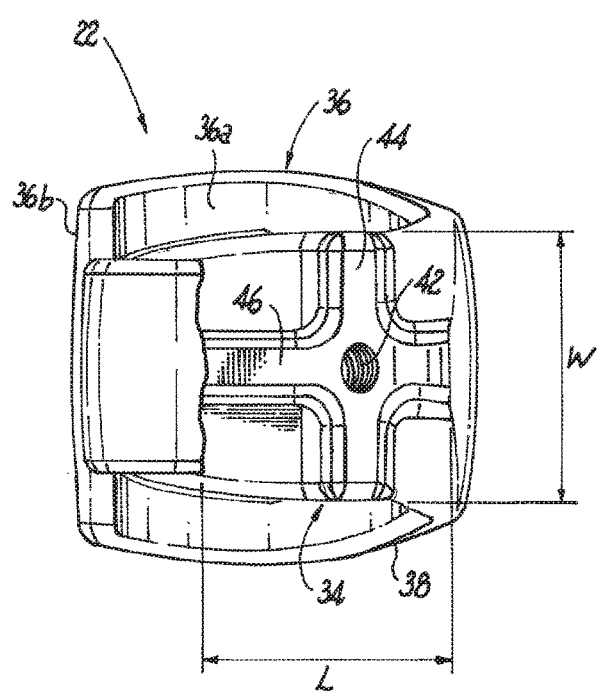
FIG. 6 is a bottom plan view in partial cross-section of the body of the clamp assembly of FIG. 5.

In this exemplary embodiment, the conductor holding portion 30 includes base 34, seat 36 and wall 38 between the base 34 and the seat 36, best seen in FIG. 5. The base 34, seat 36 and wall 38 also define a conductor receiving opening 40. The base 34 of the body 22 has a threaded aperture 42, seen in FIGS. 3 and 6, configured to receive a fastening member 93, e.g., threads along a portion of the stem 90 positioned at a proximal end of the shaft 92 of the stem. The base 34 of the body 22 also has a first protruding foot member 44 that may extend along a width "W" of the base 34 including the threaded aperture 42 as seen in FIG. 6. In another embodiment, the first protruding foot member 44 may be a plurality of protruding foot members spaced apart along the width "W" of the base 34. The first protruding foot member 44 is used when coupling the damper clamp 10 to, for example, a crown of an extensible reach tool (not shown) when installing the damper clamp on a conductor. The base 34 of the body 22 may also include a second protruding foot member 46 that may extend along a length "L" of the base 34 including the threaded aperture 42 as seen in FIG. 6. As such, the first protruding foot member 44 may intersect the second protruding foot member 46. In another embodiment, the second protruding foot member 46 may be a plurality of protruding foot members spaced apart along the length "U" of the base 34. The second protruding foot member 46 is also used when coupling the damper clamp 10 to, for example, a crown of an extensible reach tool when installing the damper clamp 10 on a conductor 500.

Referring again to FIGS. 1 and 5, the seat 36 of the body 22 is shaped to receive a portion of a conductor, e.g., conductor 500 seen in FIG. 1, and to temporarily rest on the conductor until the keeper 60 is biased to a clamping position by spring 120 and tightened as described below. In the exemplary embodiment shown, the seat 36 is an arcuate structure, e.g., a C-shaped structure, having an arcuate portion 36a, generally represented by line B extending from the wall 38, and an overhang portion 36b extending from the arcuate portion 36a. The overhang portion 36b helps maintain the damper clamp 10 on the conductor 500 when installing the damper clamp 10. The wall 38 of the body 22 is, in this exemplary embodiment, substantially perpendicular to the base 34. An inner surface 38a of the wall 38 has a boss 48 that interacts with the keeper 60 to limit rotation of the keeper when the keeper is moving between the open position and the clamping position, as described below.

Figure 12:
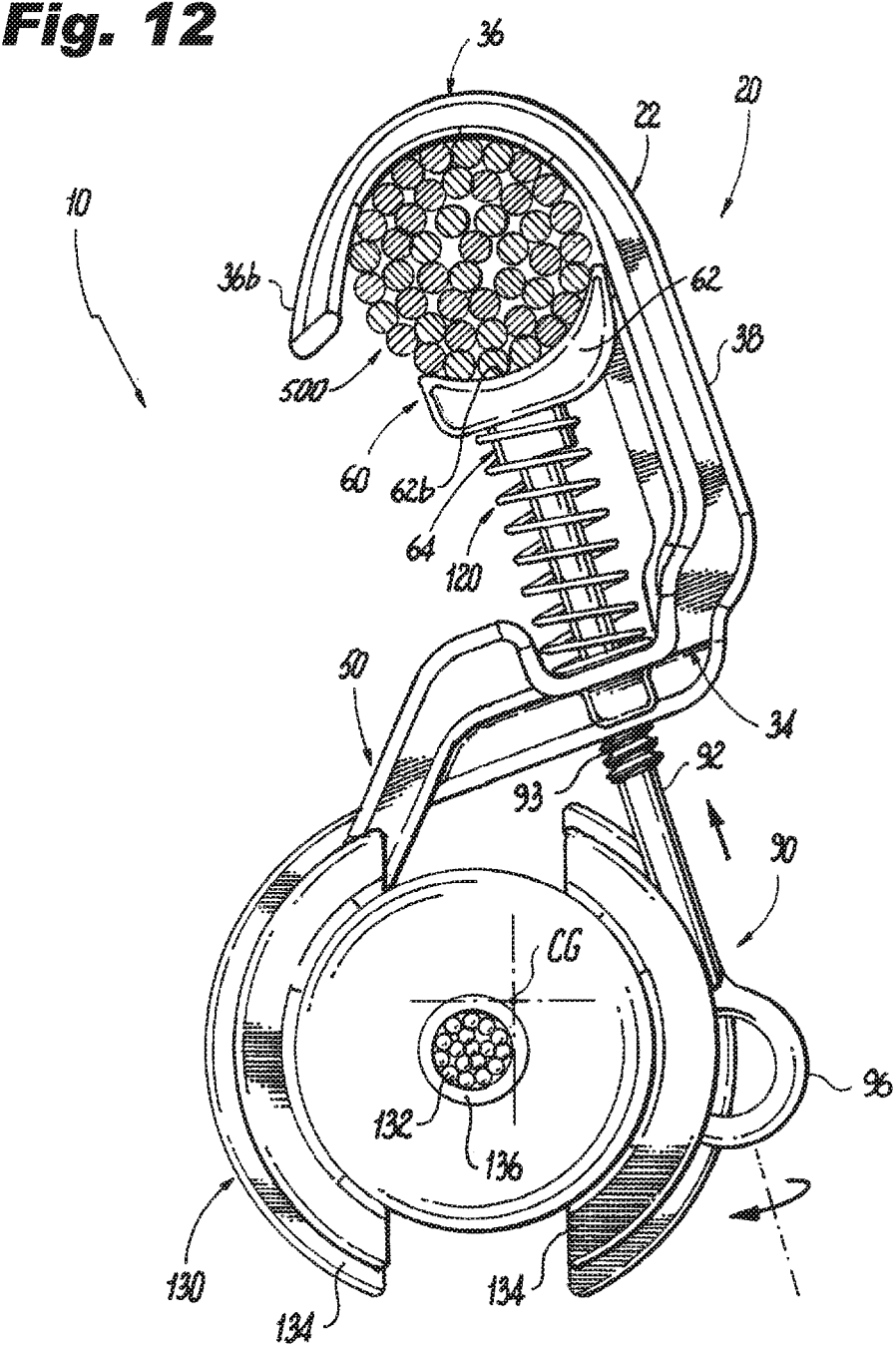
FIG. 12 is a side elevation view of the damper clamp and conductor of FIG. 11, illustrating the conductor resting in the seat and the keeper of the clamp assembly in the clamping position and the spring of the clamp assembly releasably securing the conductor to the clamp assembly.

Referring to FIGS. 2, 3, 5 and 12, in this exemplary embodiment, the damper holding portion 32 of the body 22 includes damper bracket 50 extending from a front side of the base 34. The damper bracket 50 includes a damper holder member 52. An upper surface 54 of the damper bracket 50 that is closest to the conductor receiving opening 40 is angled to form a lead-in that helps guide a conductor 500 into the conductor receiving opening 40. The damper holder member 52 includes an aperture 56, seen in FIG. 5, and a sleeve 58 secured within the aperture 56 that is capable of receiving a weight holding member 132, e.g., a messenger wire, of the damper assembly 130 as described below. The sleeve 58 is preferably press fit within the aperture 56, but the sleeve may also be secured within the aperture 56 using mechanical or adhesive fasteners or welds, or the sleeve 58 may be cast into the damper holder member 52. As seen in FIGS. 5 and 12, the sleeve 58 of the damper holder member 52 is positioned so that the center $C_A$ of the sleeve is vertically in-line with and vertically parallel to the center $C_S$ of the seat 36, generally represented by dotted line C. With the center $C_A$ of the sleeve 58 vertically in-line with and vertically parallel to the center $C_S$ of the seat 36, the center of gravity CG of the damper clamp 10 is balanced so that the conductor 500 remains within the seat 36 of the body 22 as the damper clamp 10 is mounted to a conductor and as the keeper 60 is biased toward the clamping position and secured to the conductor 500. In addition, with the center $C_A$ of the sleeve aligned with the center $C_S$ of the seat 36, the aperture 42 in the base 34 is offset from the damper assembly 130, generally represented by dotted line D, so that the stem 90 can be coupled to an extendible reach tool without interference from the damper assembly 130.

Figure 4:
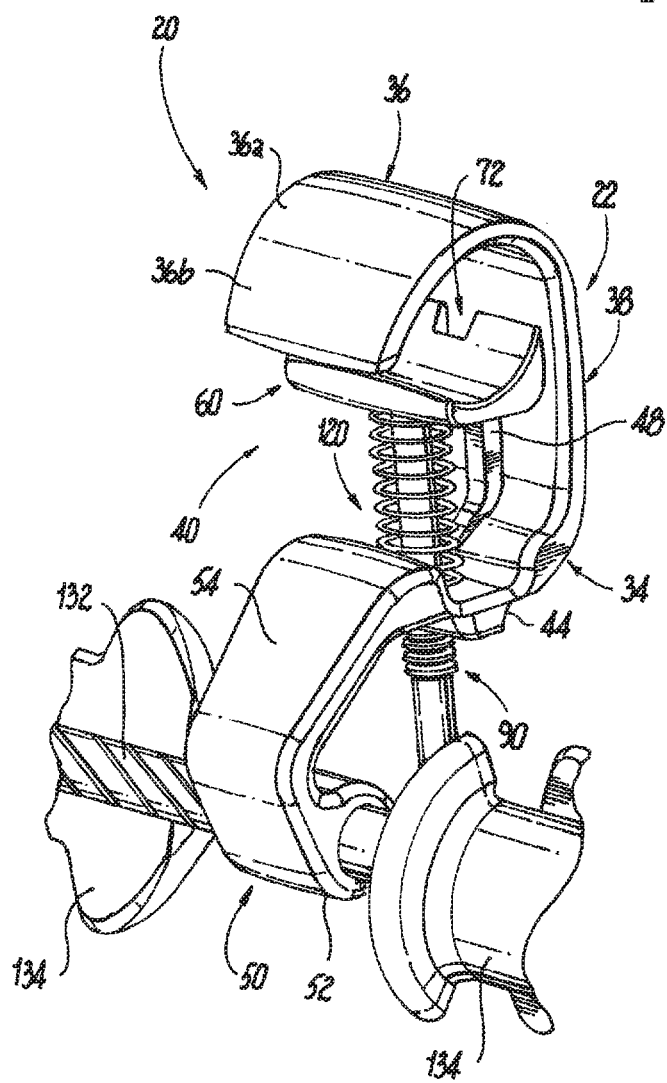
FIG. 4 is a perspective view of the clamp assembly of FIG. 2 in a clamping position.
Figure 7:
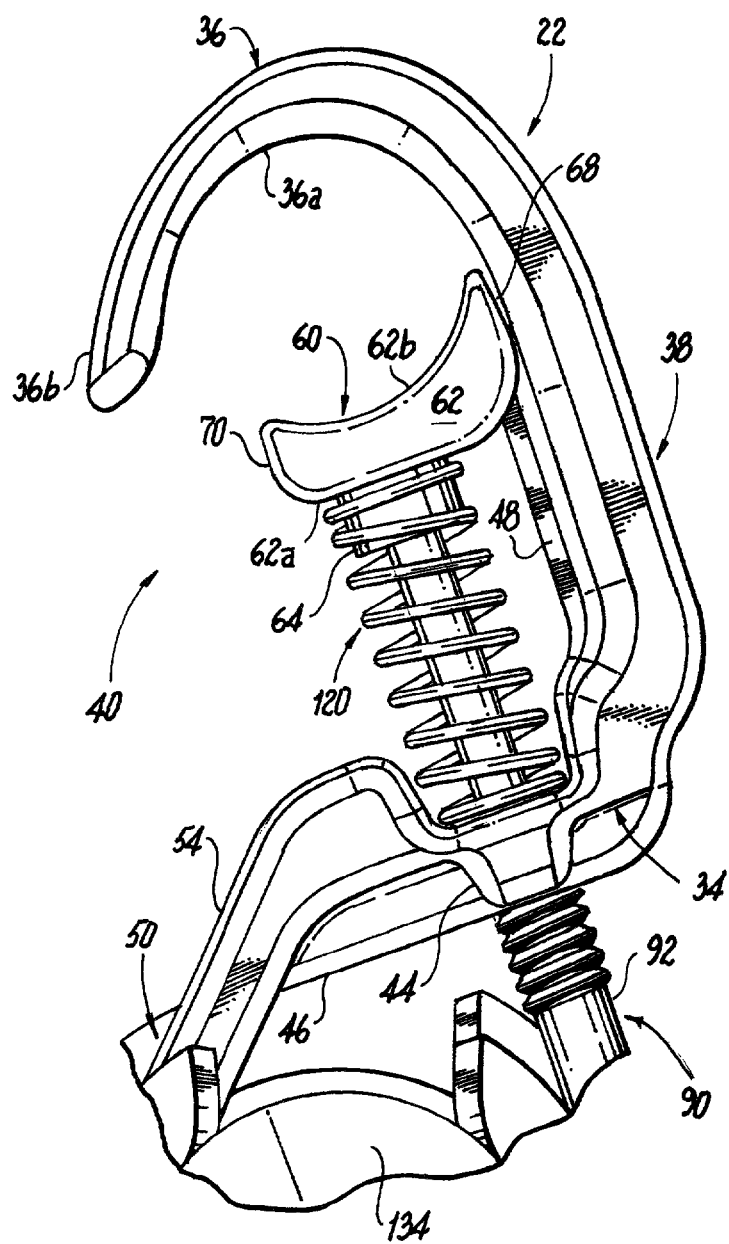
FIG. 7 is a side elevation view of a conductor holding portion of the damper clamp of FIG. 2, illustrating the clamp assembly in a clamping position where an exemplary embodiment of a keeper is coupled to a stem and biased toward the clamping position by a spring.
Figure 8A:
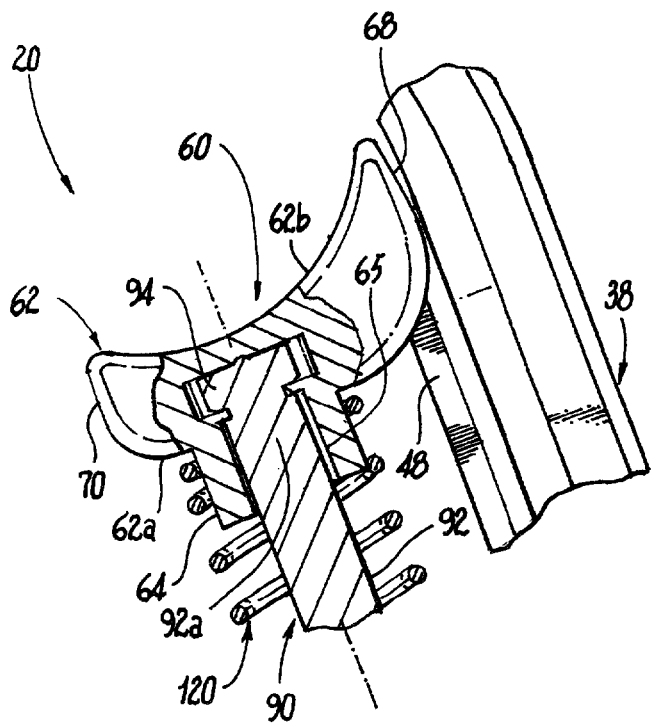
FIG. 8A is side elevation view in partial cross-section of an exemplary embodiment of the keeper, stem and spring of FIG. 7.
Figure 8B:
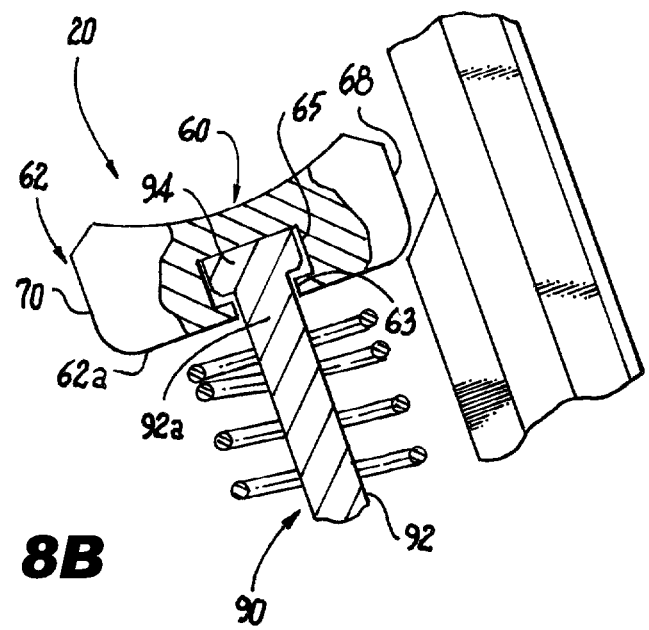
FIG. 8B is side elevation view in partial cross-section of another exemplary embodiment of the keeper, stem and spring of FIG. 7.

As noted above, the clamp assembly 20 includes a keeper 60. Referring to FIGS. 4, 7 and 8A, the keeper 60 is configured to fit within the conductor receiving opening 40 of the conductor holding portion 30. The keeper 60 includes a pressure plate 62 that has a bottom surface 62a and a top surface 62b. The bottom surface 62a is substantially flat with a stem bracket 64, e.g., a collar, extending from the bottom surface 62a. In the embodiment shown, the stem bracket 64 is a collar having a hollow, circular shaped wall configured to receive a keeper coupling member 94 at a distal end portion 92a of the shaft 92 of the stem 90 as shown in FIG. 8A and described in more detail below. In another exemplary embodiment shown in FIG. 8B, the bottom surface 62a of the keeper 60 is substantially flat with an aperture 63 configured to receive the keeper coupling member 94 at the distal end portion 92a of the shaft 92 of the stem 90 as described below. The top surface 62b of the keeper 60 is arcuate in shape to form a conductor groove that faces the seat 36. The top surface 62b of the keeper 60 may include a plurality of teeth or knurling to better grip a conductor contacting the keeper 60. In the exemplary embodiment of FIG. 8A, a first side wall 68 of the keeper 60 may be larger than a second side wall 70 of the keeper 60. The first side wall 68 extends the length of the arc of the top surface 62b of the keeper 60 to better position the conductor 500 within the seat 36. In the exemplary embodiment of FIG. 8B, the side walls 68 and 70 are symmetrical.

Figure 2:
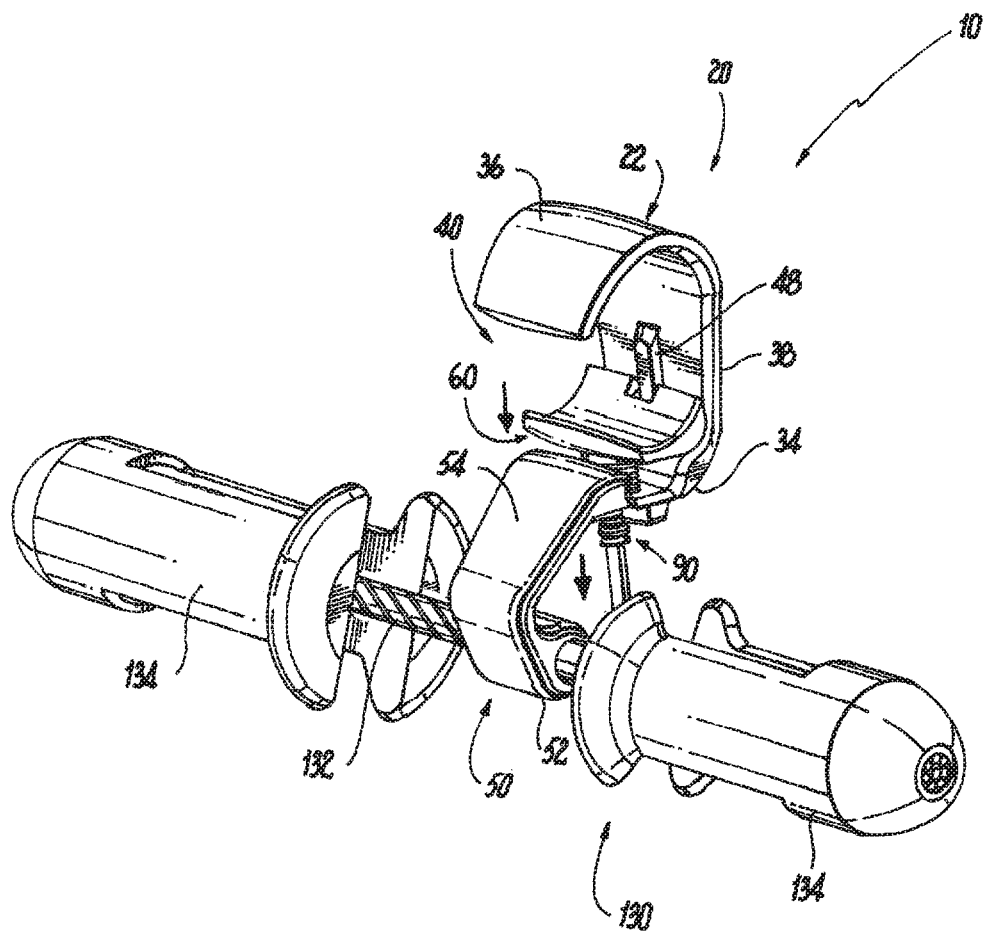
FIG. 2 is a perspective view of the damper clamp of FIG. 1 without the conductor, and illustrating the clamp assembly in an open position and a damper assembly extending from the clamp assembly.

The keeper 60 is movable within the conductor receiving opening 40 of the body 22 of the clamp assembly 20 between an open position, seen in FIG. 2, where a conductor 500 can be received within the conductor receiving opening 40 between the seat 36 and the top surface 62b of the keeper 60, and a clamping position, seen in FIGS. 1 and 4, where a conductor can be clamped between the seat 36 and the top surface 62b on the keeper 60. To limit rotation of the keeper 60 relative to the wall 38, the keeper 60 includes a notch 72, seen in FIG. 4, that receives the boss 48 on the wall 38 of the body 22. In this exemplary embodiment, as the keeper 60 moves between the open and clamping positions, the notch 72 in the keeper 60 rides along the boss 48 on the wall 38 which limits the rotation of the keeper 60 relative to the wall 38.

Referring to FIGS. 3, 7, 8A and 8B, the stem 90 is preferably an eye-stem that has a shaft 92 with a fastening member 93, e.g., threads along a portion of the shaft 92, a keeper coupling member 94 at a distal end portion 92a of the shaft 92 and tool mounting member 96 at a proximal end of the shaft 92. Other types of stems are contemplated. As non-limiting examples, the stem 90 may be a bolt or a break-away bolt. In the exemplary embodiment of FIG. 8A, the keeper coupling member 94 is configured to pass through the stem bracket 64 and fit within the coupling member 65, e.g., an aperture or channel, in the stem bracket so that the stem 90 can be rotatably coupled to the keeper 60. The keeper coupling member 94 in the exemplary embodiment shown is a T-shaped member configured to fit within a T-shaped channel forming the coupling member 65 extending through the stem bracket 64 into the pressure plate 62 of the keeper 60. However, it is noted that the coupling member 65 and the keeper coupling member 94 may be in any shape sufficient to couple the keeper 60 to the stem 90. In the exemplary embodiment of FIG. 8B, the keeper coupling member 94 is configured to fit within the coupling member 65 in the keeper 60 so that the stem 90 can be rotatably coupled to the keeper 60. The keeper coupling member 94 is a T-shaped member configured to fit within a T-shaped channel forming the coupling member 65 that extends into the pressure plate 62 of the keeper 60. However, it is noted that the coupling member 65 and the keeper coupling member 94 may be in any shape sufficient to couple the keeper 60 to the stem 90. In both exemplary embodiments shown, the keeper 60 is rotatably coupled to the stem 90 so that the stem 90 can rotate without rotating the keeper 60. In another exemplary embodiment, the keeper 60 could be coupled to the stem 90 with a ball and socket type joint where the keeper 60 could swivel relative to the stem 90 and the stem 90 could rotate without rotating the keeper 60.

Figure 3:
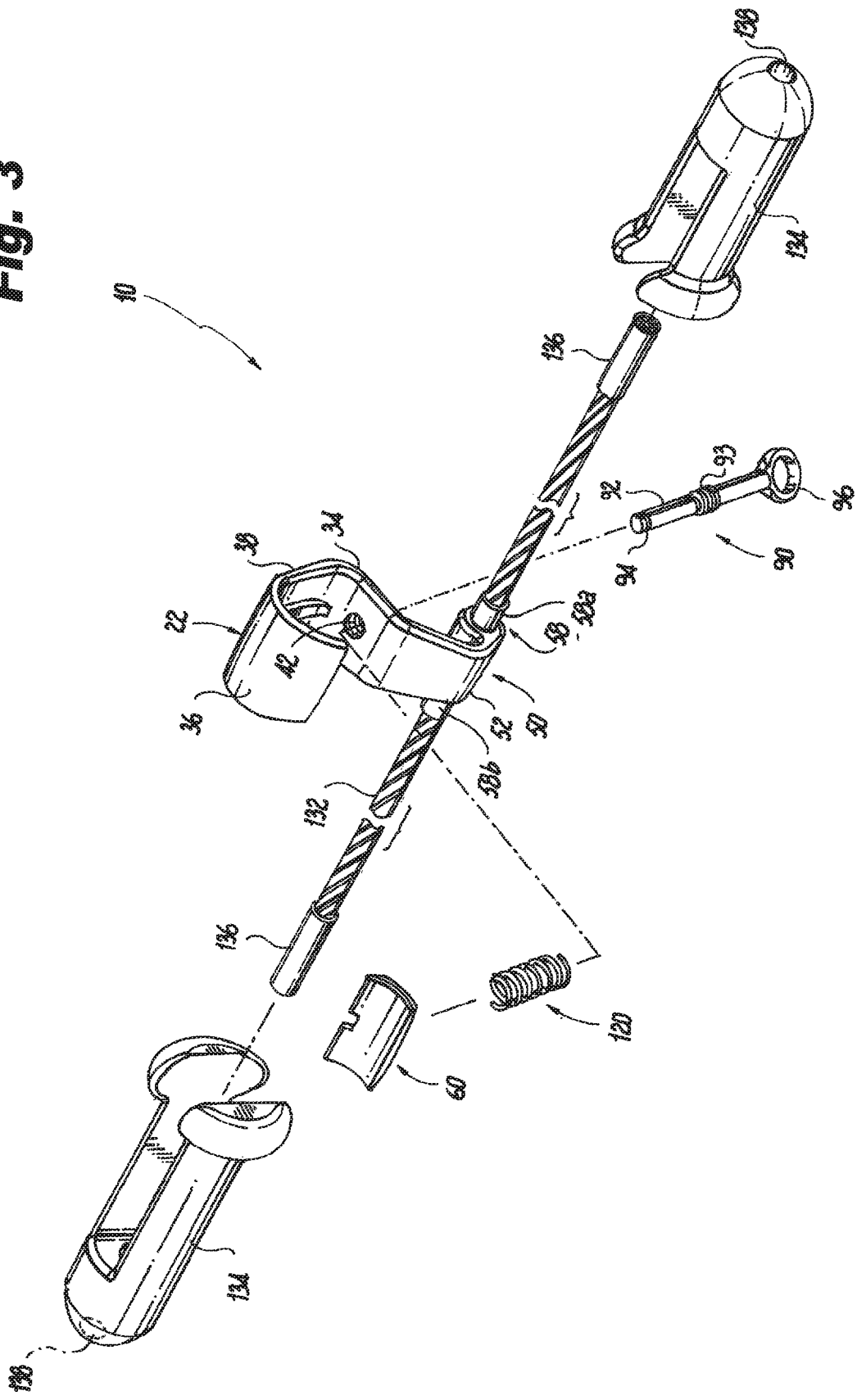
FIG. 3 is an exploded perspective view of the damper clamp of FIG. 2.

The tool mounting member 96, seen in FIG. 3, of the stem 90 is used to releasably couple the stem 90 to an extendable reach tool (not shown). In the embodiment shown, the tool mounting member 96 is an eye or looped member that enables the extendible reach tool to manipulate, e.g., rotate, pull and/or push, the stem 90. With the stem 90 coupled to the keeper 60, when the stem 90 is rotated, the rotational movement of the stem 90 is translated to linear movement of the keeper 60 within the conductor receiving opening 40 of the body the clamp assembly 20 along the boss 48 of the wall 38. With the stem 90 coupled to the keeper 60, when the stem 90 is pulled or pushed the keeper 60 moves linearly within the conductor receiving opening 40 of the body 22 of the clamp assembly 20 along the boss 48 of the will 38.

In the exemplary embodiment of FIGS. 7 and 8A, the spring 120 is a conventional helical spring that fits around the shaft 92 of the stem 90 and the stem bracket 64 between the pressure plate 62 of the keeper 60 and base 34 of the body 22. In the exemplary embodiment of FIG. 8B, the spring 120 is a conventional helical spring that fits around the shaft 92 of the stem 90 between the pressure plate 62 of the keeper 60 and base 34 of the body 22. In both embodiments, the spring 120 normally biases the keeper 60 toward the clamping position, i.e., toward the seat 36 of the body 22, in order to temporarily secure, clamp or hold a conductor 500 positioned within the conductor receiving opening 40 to the seat 36.

Referring again to FIGS. 2 and 3, an exemplary embodiment of a damper assembly 130 is shown. In this exemplary embodiment, the damper assembly 130 includes a weight holding member 132 and one or more damper weights 134 secured to the weight holding member 132. A non-limiting example of weight holding member is a messenger wire, or any other member that can flex to absorb vibration. In the exemplary embodiment shown, the weight holding member 132 is a messenger wire. The weight holding member 132 is positioned within the sleeve 58 of the damper holder member 52 of the clamp assembly 20 and is secured to the sleeve 58 by crimping portions 58a and 58b of the sleeve 58 to the weight holding member 132, seen in FIG. 3. In an exemplary embodiment, the weight holding member 132 may be positioned in the sleeve 58 so that the clamp assembly 20 is off-center relative to the weight holding member 132 to better dampen desired vibrations. In another exemplary embodiment, the weight holding member 132 may be centered in the sleeve 58 so that the clamp assembly 20 is located at the center of the weight holding member 132 to better dampen desired vibrations and help balance the damper assembly 130 relative to the clamp assembly 20. In another exemplary embodiment, the damper holder member 52 may not include the sleeve 58 such that the weight holding member 132 may be secured to or integrally molded or cast into the damper holder member 52 in a manner described above.

Continuing to refer to FIGS. 2 and 3, in the exemplary embodiment shown, there are two damper weights 134 secured to the weight holding member 132. Each damper weight 134 may weigh the same or each damper weight may have a different weight depending upon the frequency of the vibrations to be dampened, as is known. In addition, the dimensions of each damper weight 134 may be the same or they may differ as is known. To secure the damper weights 134 to the weight holding member 132, a weight attaching sleeve 136 is secured to, e.g., crimped, to each end of the weight holding member 132, as seen in FIG. 3. A mounting aperture 138 in the first damper weight 134 is then positioned for insertion onto one of the weight attaching sleeves 136 and is press fit onto the weight attaching sleeve to secure the damper weight 134 to the weight holding member 132. A mounting aperture 138 in the second damper weight 134 is then positioned for insertion onto the other weight attaching sleeve 136 and is press fit onto the weight attaching sleeve to secure the damper weight 134 to the weight holding member 132. While the damper weights 134 are described as being press fit to weight attaching sleeves 136 secured to the weight holding member 132, the present disclosure contemplates other known techniques for securing the damper weights to the weight holding member 132, including mechanical or adhesive fasteners and welds.

It is noted that the clamp assembly 20 and damper assembly 130 according to the present disclosure can be made of a metallic material, a non-metallic material or a combination of metallic and non-metallic materials. Non-limiting examples of metallic materials include aluminum, cast aluminum, galvanized steel or stainless steel. Non-limiting examples of non-metallic materials include rigid plastic materials or composite materials e.g., carbon fiber.

Figure 11:
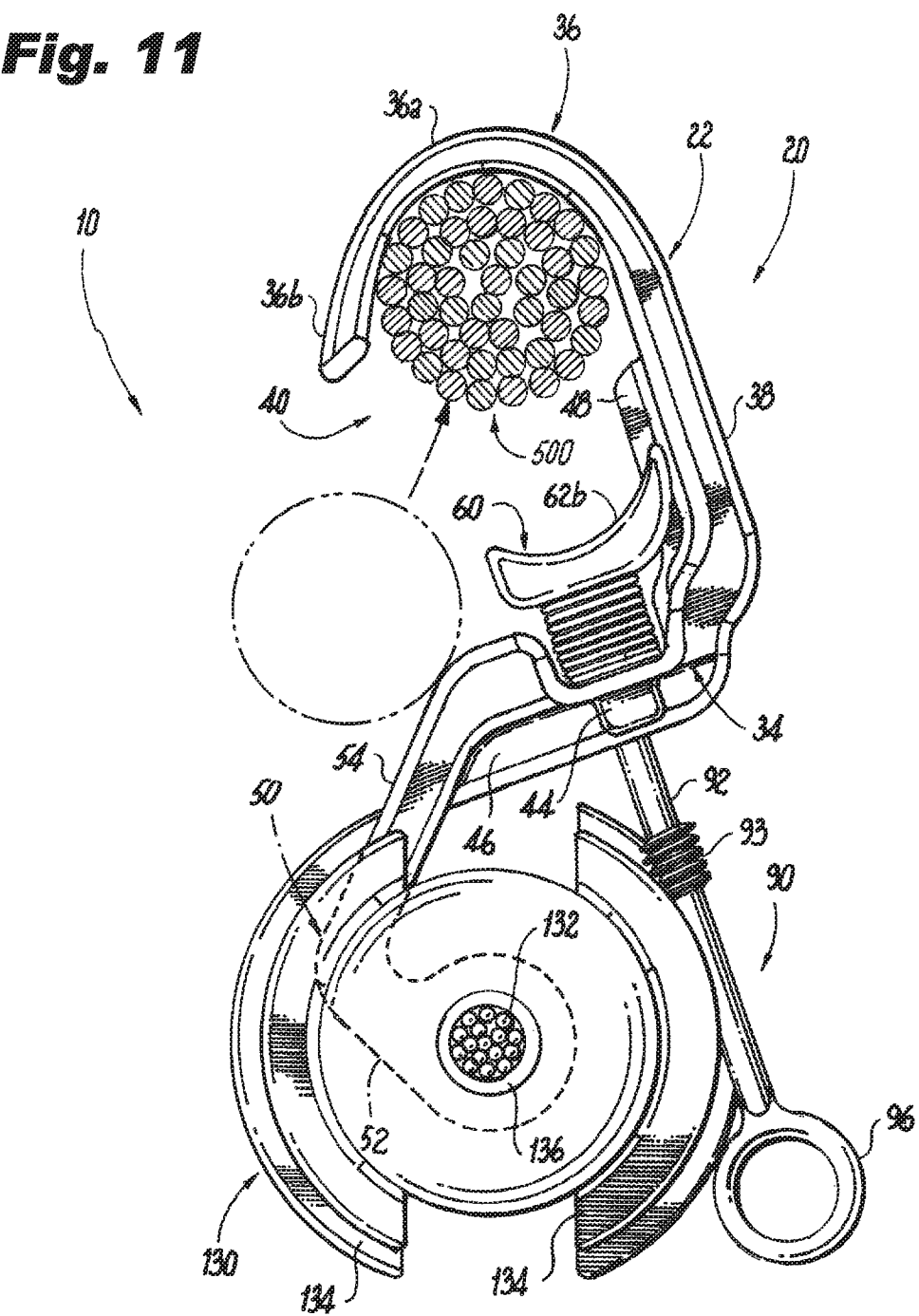
FIG. 11 is a side elevation view of the damper clamp and conductor of FIG. 10, illustrating the conductor passing into the conductor receiving opening and resting in a seat of the clamp assembly.

Referring now to FIGS. 9-12, installation of the damper clamp 10 on an overhead conductor 500 spanning two utility poles from the ground will be described using a hot stick as the extensible reach tool. Initially, a lineman (or other service technician) positions the hot stick near the tool mounting member 96, e.g., an eye or looped member, and opens a retractable hook at the crown of the hot stick (not shown) using an operating mechanism (not shown) on the hot stick to grasp the tool mounting member 96. The lineman then retracts the hook into the hot stick using the operating mechanism so that the tool mounting member 96 and shaft 92 of the stem 90 slide into the hot stick until the crown of the hot stick contacts the base 34 of the body 22 and engages the first and second protruding foot members 44 and 46, as is known. Retracting the stem 90 into the hot stick pulls the stem 90 moving the keeper 60 to the open position compressing spring 120, seen in FIG. 9. The hot stick is then hoisted toward the overhead conductor 500 so that the seat 36 of the body 22 extends above the conductor as seen in FIG. 9. The lineman then lowers the hot stick toward the conductor 500 so that the conductor enters the conductor receiving opening 40 in the clamp assembly 20 as seen in FIG. 10. As the lineman lowers the hot stick, the conductor 500 may contact the lead-in surface 54 of the damper bracket 50 which helps to guide the conductor into the conductor receiving opening 40 of the clamp assembly 20 as seen in FIG. 10. The lineman further lowers the hot stick so that the conductor 500 enters the conductor receiving opening 40 of the clamp assembly 20 and comes to rest in the seat 36 of the body 22 of the clamp assembly 20, as seen in FIG. 11. With the conductor 500 resting in the seat 36, the lineman then releases the operating mechanism of the hot stick so that the stem 90 is free to move. With the stem 90 free to move, tension on the spring 120 is released permitting the spring to bias the keeper 60 toward the seat 36, i.e., toward the clamping position, seen in FIG. 12. At this point, the keeper 60 temporarily holds the conductor 500 within the seat 36. The lineman can then rotate the stem 90 so that the fastening member 93 on the shaft 92 enters the aperture 42 in the base 34, seen in FIG. 12. Further rotation of the stem 90 is then translated to linear motion of the keeper 60 so that the pressure plate 62 of the keeper is pressed against the conductor 500 to releasably secure or clamp the conductor to the damper clamp 10. Rotating the stem 90 in the opposite direction facilitates removal of the conductor from the damper clamp 10.

Figure 13:
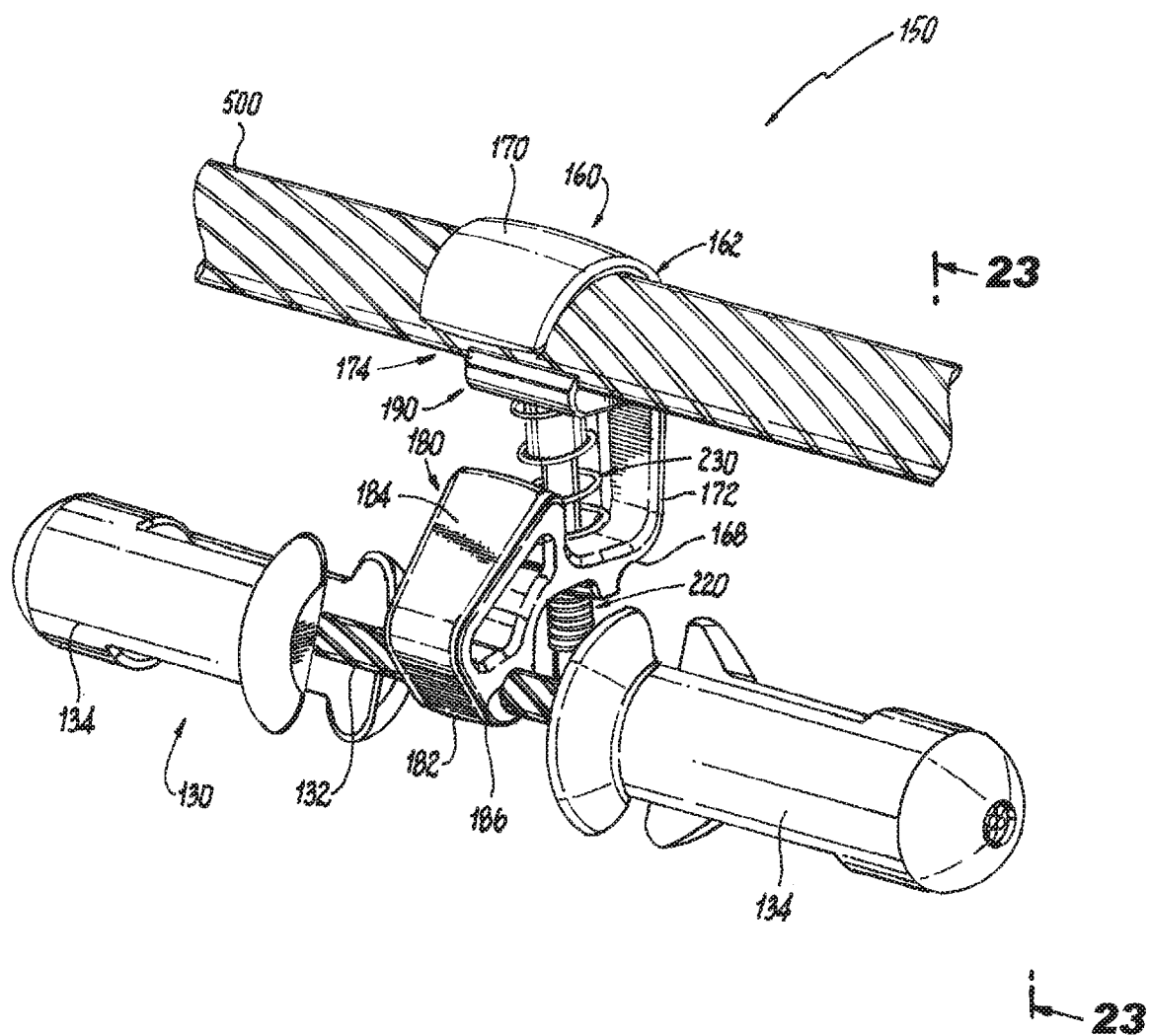
FIG. 13 is a perspective view of another exemplary embodiment of a damper clamp according to the present disclosure releasably secured to a conductor, and illustrating a clamp assembly in a clamping position and a damper assembly extending from the clamp assembly.

Referring now to FIG. 13, another exemplary embodiment of a damper clamp according to the present disclosure secured to a conductor is shown. The damper clamp 150 includes a clamp assembly 160 and a damper assembly 130, which is similar to the damper assembly 130 described above and for ease of description is not repeated. The clamp assembly 160 is configured to be installed on a conductor 500 and the damper assembly 130 is secured to, or integrally or monolithically formed into the clamp assembly 160.

Referring now to FIGS. 14-18, another exemplary embodiment of the clamp assembly 160 of the damper clamp 150 will be described. The clamp assembly 160 has a body 162, a keeper 190, a stem 220 and a spring 230. For general reference purposes, the body 162 has a conductor holding portion 164 and a damper holding portion 166, seen in FIG. 15. The body 162 may be a unitary body or may include multiple components secured to each other using, for example, mechanical or adhesive fasteners or welds. For example, the conductor holding portion 164 and the damper holding portion 166 may be formed as a unitary or monolithic structure, or the conductor holding portion 164 and the damper holding portion 166 may be separate components that are secured together. In the exemplary embodiment shown the conductor holding portion 164 and the damper holding portion 166 are formed as a monolithic structure.

Figure 15:
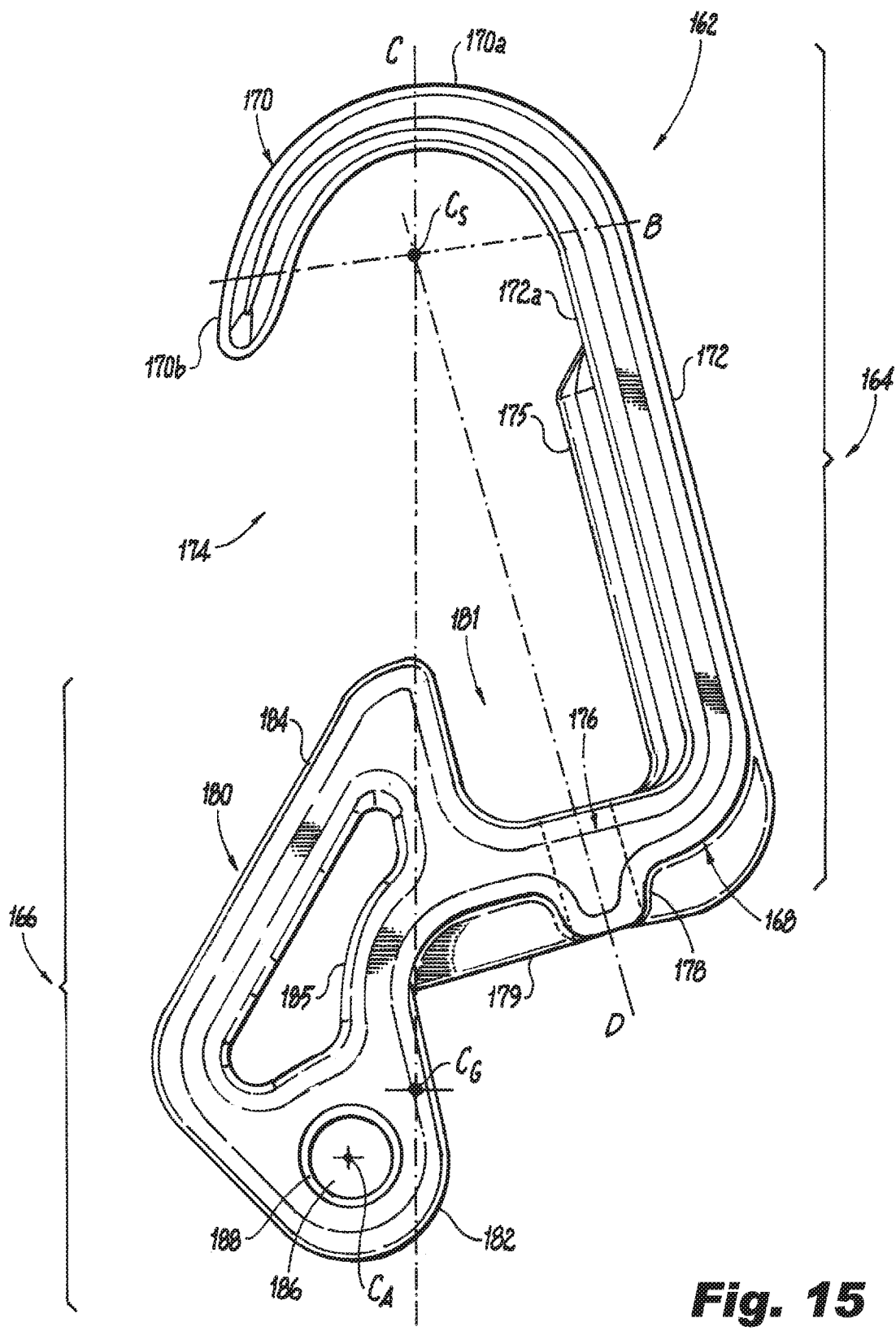
FIG. 15 is a side elevation view of a body of the clamp assembly of FIG. 14.

Referring to FIG. 15, in this exemplary embodiment, the conductor holding portion 164 includes base 168, seat 170 and wall 172 between the base 168 and the seat 170. The base 168, seat 170 and wall 172 also define a conductor receiving opening 174. The base 168 of the body 162 has an aperture 176, e.g., a threaded aperture, configured to receive a fastening member 226 on the shaft 224 of the stem 220 described in more detail below. The base 168 of the body 162 also has a first protruding foot member 178, which is similar to the first protruding foot member 44 described above. The first protruding foot member 178 may extend along a width of the base 168 including the threaded aperture 176. It is noted that the width of the base 168 is similar to the width "W" described above. In another embodiment, the first protruding foot member 178 may be a plurality of protruding foot members spaced apart along the width "W"

of the base 168. The first protruding foot member 178 is used when coupling the damper clamp 150 to, for example, a crown of an extensible reach tool (not shown) when installing the damper clamp on a conductor 500. The base 168 of the body 162 may also include a second protruding foot member 179, which is similar to the second protruding foot member 46 described above. The second protruding foot member 179 may extend along a length of the base 168 including the threaded aperture 176. It is noted that the length of the base 168 is similar to the length "L" described above. As such, the first protruding foot member 178 may intersect the second protruding foot member 179. In another embodiment, the second protruding foot member 179 may be a plurality of protruding foot members spaced apart along the length "L" of the base 168. The second protruding foot member 179 is also used when coupling the damper clamp 150 to, for example, a crown of an extensible reach tool when installing the damper clamp 150 on a conductor 500.

Continuing to refer to FIG. 15, the seat 170 of the body 162 is shaped to receive a portion of a conductor, e.g., conductor 500 seen in FIG. 13, and to temporarily rest on the conductor 500 until the keeper 190 is biased to a clamping position by spring 230 and tightened as described below. In the exemplary embodiment shown, the seat 170 is an arcuate structure, e.g., a C-shaped structure, having an arcuate portion 170a and an overhang portion 170b. The arcuate portion 170a is generally represented by line B extending from the wall 172. The overhang portion 170b extends from the arcuate portion 170a as shown. The overhang portion 170b helps maintain the damper clamp 150 on the conductor 500 when installing the damper clamp. The wall 172 of the body 162 is, in this exemplary embodiment, substantially perpendicular to the base 168. An inner surface 172a of the wall 172 has a boss 175 that interacts with the keeper 190 to limit rotation of the keeper 190 when the keeper is moving between the open position and the clamping position, as described below.

Continuing to refer to FIG. 15, in this exemplary embodiment, the damper holding portion 166 of the body 162 includes damper bracket 180 extending from a front side of the base 168 such that a portion of the damper bracket 180, the base 168 and the wall 172 form a keeper channel 181. The damper bracket 180 includes a damper holder member 182. An upper surface 184 of the damper bracket 180 that is closest to the conductor receiving opening 174 is angled to form a lead-in that helps guide a conductor 500 into the conductor receiving opening 174. The damper bracket 180 may also include an optional support bracket 185 between the damper holder member 182 and the base 168.

Figure 14:
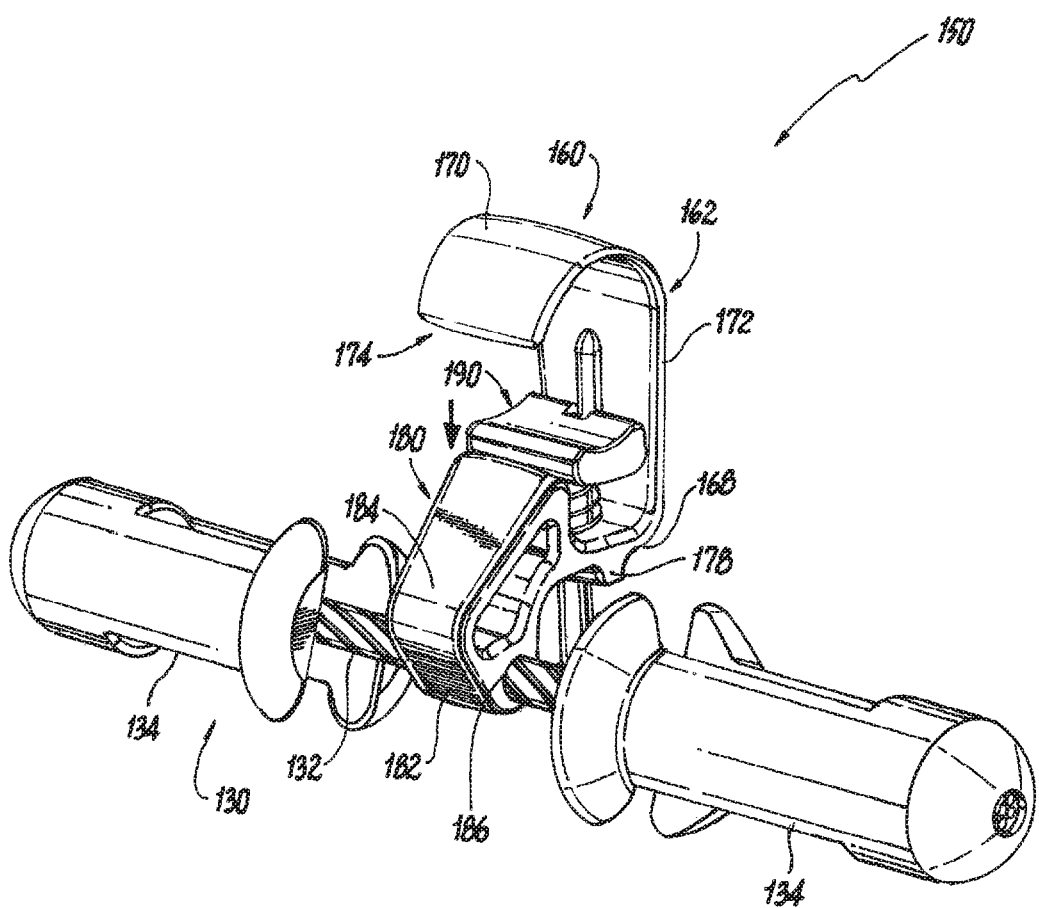
FIG. 14 is a perspective view of the damper clamp of FIG. 13 without the conductor, and illustrating the clamp assembly in an open position and a damper assembly extending from the clamp assembly.

The damper holder member 182 includes an aperture 186 and a sleeve 188 secured within the aperture 186 that is capable of receiving a weight holding member 132, e.g., a messenger wire seen in FIGS. 13 and 14, of the damper assembly 130 as described above. The sleeve 188 is preferably press fit within the aperture 186, but the sleeve 188 may also be secured within the aperture 186 using mechanical or adhesive fasteners or welds, or the sleeve 188 may be cast into the damper holder member 182. As seen in FIG. 15, the sleeve 188 of the damper holder member 182 is positioned so that the center $C_A$ of the sleeve 188 is vertically in-line with and vertically parallel to the center $C_S$ of the seat 170, generally represented by dotted line C. With the center $C_A$ of the sleeve 188 vertically in-line with and vertically parallel to the center $C_S$ of the seat 170, the center of gravity CG of the damper clamp 150 is balanced so that the conductor 500 remains within the seat 170 of the body 162 as the damper clamp 150 is mounted to a conductor 500 and as the keeper 190 is biased toward the clamping position and secured to the conductor 500. In addition, with the center $C_A$ of the sleeve aligned with the center $C_S$ of the seat 170, the aperture 176 in the base 168 is offset from the damper assembly 130, generally represented by dotted line D in FIG. 15, so that the stem 220 can be coupled to an extendible reach tool without interference from the damper assembly 130.

Figure 16:
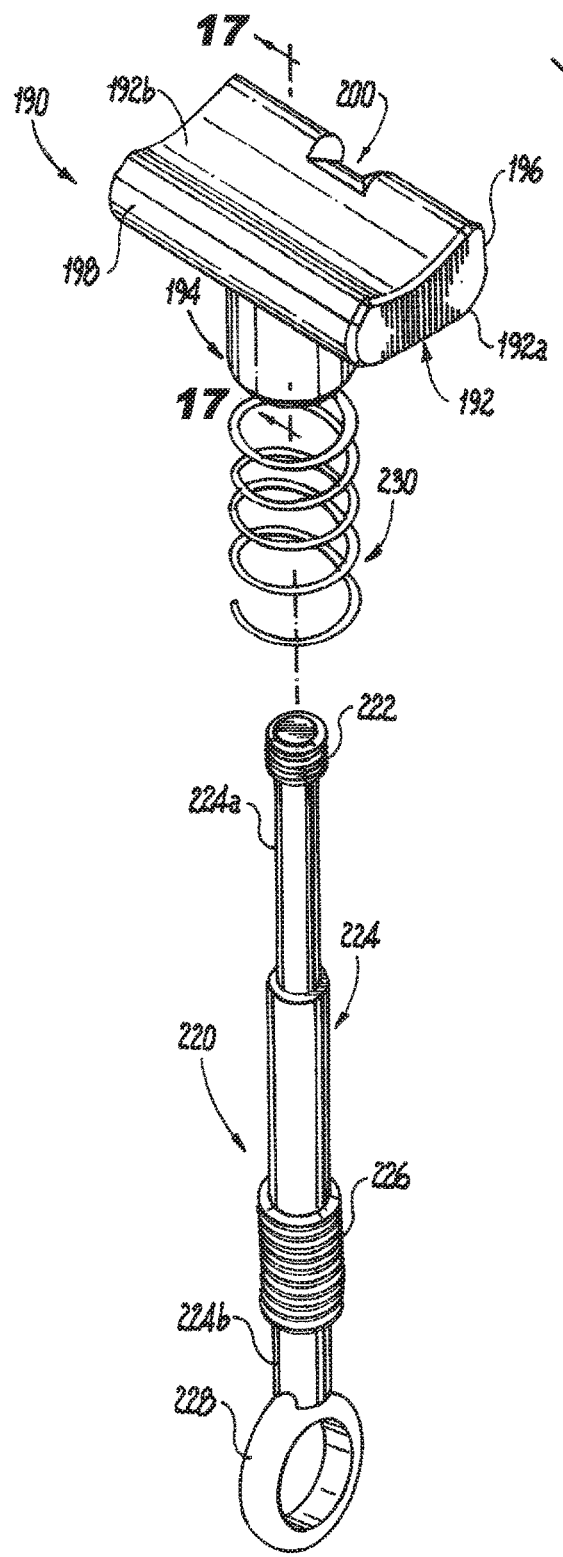
FIG. 16 is a perspective view with parts separated of another exemplary embodiment of a keeper, stem and spring of the damper clamp of FIG. 14.
Figure 17:
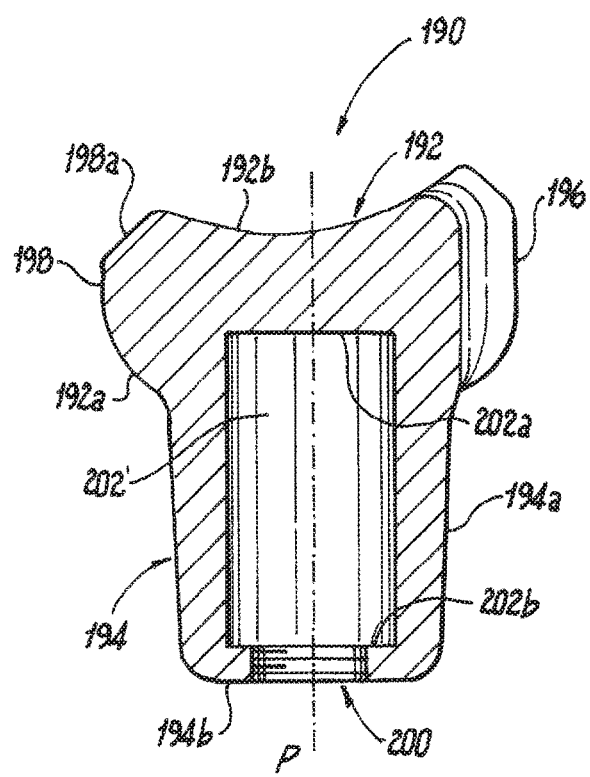
FIG. 17 is side elevation view in partial cross-section of the keeper of FIG. 16, illustrating a pocket within the keeper that receives a keeper coupling member at a distal end of the stem.

As noted above, the clamp assembly 160 includes a keeper 190. Referring to FIGS. 15-17, the keeper 190 is configured to fit within the conductor receiving opening 174 of the conductor holding portion 164 and within the keeper channel 181. In this exemplary embodiment, the keeper 190 includes a pressure plate 192 and a stem bracket 194 extending from a bottom surface 192a of the pressure plate 192. The pressure plate 192 and stem bracket 194 may be a unitary or monolithic structure or may include multiple components secured to each other using, for example, mechanical or adhesive fasteners or welds. In the exemplary embodiment shown, the pressure plate 192 and the stem bracket 194 are formed as a monolithic structure.

Continuing to refer to FIGS. 16 and 17, the pressure plate 192 has a top surface 192b that is arcuate in shape to form a conductor groove that faces the seat 170 of the body 162. The top surface 192b of the pressure plate 192 may include a plurality of teeth or knurling to better grip a conductor contacting the top surface 192b. In the exemplary embodiment shown, a first side will 196 of the pressure plate 192 may be larger or thicker than an opposite second side wall 198 of the pressure plate 192. The first side wall 196 helps to better position the conductor 500 within the seat 170 when the keeper 190 is in the clamping position. The second side wall 198 of the pressure plate 192 may include a beveled edge 198a between the side wall 198 and the top surface 192b which may help minimize and possibly prevent the keeper 190 from interfering with the conductor 500 as it enters the conductor receiving opening 174. It is noted that the present disclosure also contemplates that the side walls 196 and 198 can be symmetrical.

To limit rotation of the keeper 190 relative to the wall 172 of the body 162, the keeper 190 includes a notch 200, seen in FIG. 16, that receives the boss 175 on the wall 172 of the body 162, seen in FIG. 15. In this exemplary embodiment, as the keeper 190 moves between the open and clamping positions, the notch 200 in the pressure plate 192 rides along the boss 175 on the wall 172 which limits the rotation of the keeper 190 relative to the wall 172.

As noted, the stein bracket 194, e.g., a collar, of the keeper 190 extends from the bottom surface 192a of the pressure plate 192. In this exemplary embodiment, the stem bracket 194 is a collar that has a cylindrical side wall 194a and a bottom wall 194b that is substantially flat with an aperture 200, e.g., a threaded aperture, providing access to a pocket 202 within the stem bracket 194. In the embodiment shown, the pocket 202 is a cylindrical shaped pocket configured to receive a keeper coupling member 222 at a distal end portion 224a of the shaft 224 of the stein 220, as shown in FIGS. 16 and 17 and described in more detail below. It is noted that the pocket 202 may extend into the pressure plate 192. The pocket 202 includes a top end 202a and a bottom end 202b. The pocket 202 permits the shaft 224 of the stem 220 to move relative to the keeper 190. For example, the shaft 224 of the stem 220 may move relative to the keeper 190, and/or the keeper 190 may move along a longitudinal axis "P" of the pocket 202 between the top end 202a and the bottom end 202b. Therefore, the present disclosure contemplates that the pocket 202 can come in any shape that can receive the keeper coupling member 222 of the shaft 224 and that permits the keeper 190 to move relative to the shaft 224 of the stem 220.

Figure 18:
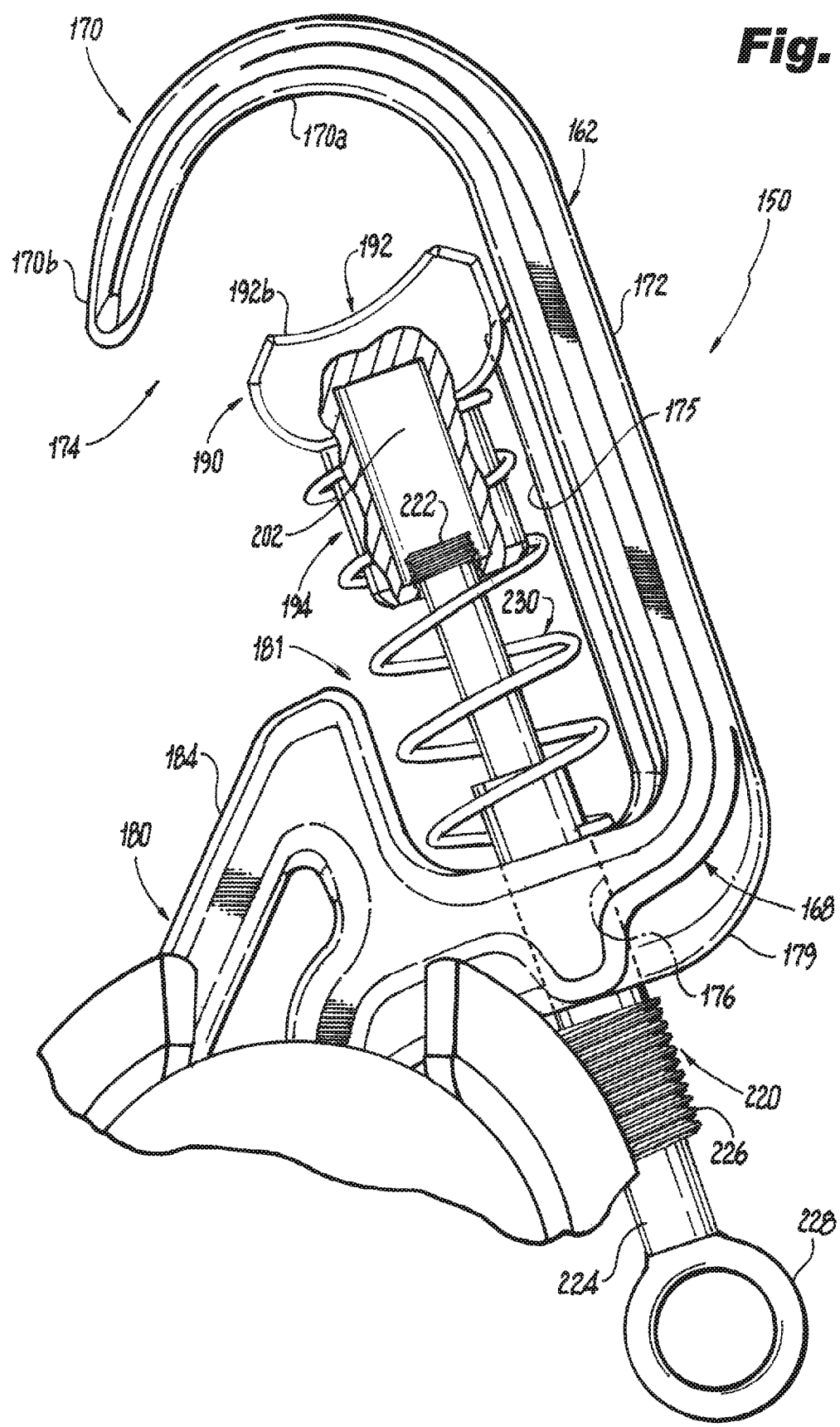
FIG. 18 is a side elevation view of a conductor holding portion of the damper clamp of FIG. 14, illustrating the clamp assembly in a clamping position where the keeper is coupled to a stem and biased toward the clamping position by the spring.

Turing to FIGS. 14 and 18, the keeper 190 is movable within the conductor receiving opening 174 of the body 162 of the clamp assembly 160 between an open position, seen in FIG. 14, where a conductor 500 can be received within the conductor receiving opening 174 between the seat 170 and the top surface 192*b* of the pressure plate 192 of the keeper 190, and a clamping position, seen in FIG. 18, where a conductor can be secured or clamped between the seat 170 and the top surface 192*b* of the pressure plate 192.

Referring to FIG. 16, the stem 220 is preferably an eye-stem. As noted above, the stem 220 includes a shaft 224 having a keeper coupling member 222, a fastening member 226, and a tool mounting portion 228. The shaft 224 has a distal end portion 224*a* and a proximal end portion 224*b*. The diameter or outer periphery of the distal end portion 224*a* may be less than the diameter or outer periphery of the proximal end portion 224*b*. In the exemplary embodiment shown, the distal end portion 224*a* has a smaller diameter or outer periphery than the proximal end portion 224*b*. The smaller diameter or outer periphery fits within the aperture 200 in the stem bracket 194. The larger diameter or outer periphery fits within the aperture 176 in the base 168.

The keeper coupling member 222 is attached to or integrally or monolithically formed at the distal end 224*a* of the shaft 224. Non-limiting examples of the keeper coupling member 222 include threading at the distal end 224*a* of the shaft 224 and a boss at the distal end 224*a* of the shaft 224, where the threading and boss have an outer diameter or periphery that is greater than the outer diameter or periphery of the distal end 224*a* of the shaft 224. In the exemplary embodiment shown, the keeper coupling member 222 includes threading at the distal end 224*a* of the shaft 224 that passes through the aperture 200 in the stem bracket 194 and is used to couple the keeper 190 to the stem 220 so that the stem can rotate without rotating the keeper 190 and so that the distal end 224*a* of the stem 224 can move within the pocket 202 along a longitudinal axis "P" of the pocket, seen in FIG. 17.

The fastening member 226 in this exemplary embodiment includes threads positioned along the shaft 224 and configured to interact with the threaded aperture 176 in the base 168. The fastening member 226 is used to tighten the keeper 190 against the conductor 500 which tightly secures the conductor within the seat 170 of the clamp body 162 when installed. It is contemplated that the fastening member 226 may be any structure sufficient to tighten the keeper 190 against the conductor 500, which tightly secures the conductor 500 within the seat 170 of the clamp body 162 when installed.

The tool mounting member 228 of the stem 220 is attached to, or integrally or monolithically formed at the proximal end 224*b* of the shaft 224. Non-limiting examples of the tool mounting member 228 include an eye or looped member. It is noted that the present disclosure contemplates other types of stems. As non-limiting examples, the stem 220 may be a bolt or a break-away bolt.

In the exemplary embodiment of FIGS. 13, 14 and 18, the spring 230 is a conventional helical spring that fits around the shaft 224 of the stem 220 and the stem bracket 194 of the keeper 190 between the bottom surface 192*a* of the pressure plate 192 of the keeper 190 and the base 168 of the body 162. The spring 230 normally biases the keeper 190 toward the clamping position, i.e., toward the seat 170 of the body 162, in order to temporarily secure, clamp or hold a conductor 500 positioned within the conductor receiving opening 174 to the seat 170 of the body 162.

It is noted that the clamp assembly 160 and damper assembly 130 of the damper clamp 150 according to the present disclosure can be made of a metallic material, a non-metallic material or a combination of metallic and non-metallic materials. Non-limiting examples of metallic materials include aluminum, cast aluminum, galvanized steel or stainless steel. Non-limiting examples of non-metallic materials include rigid plastic materials or composite materials e.g., carbon fiber.

Figure 19:
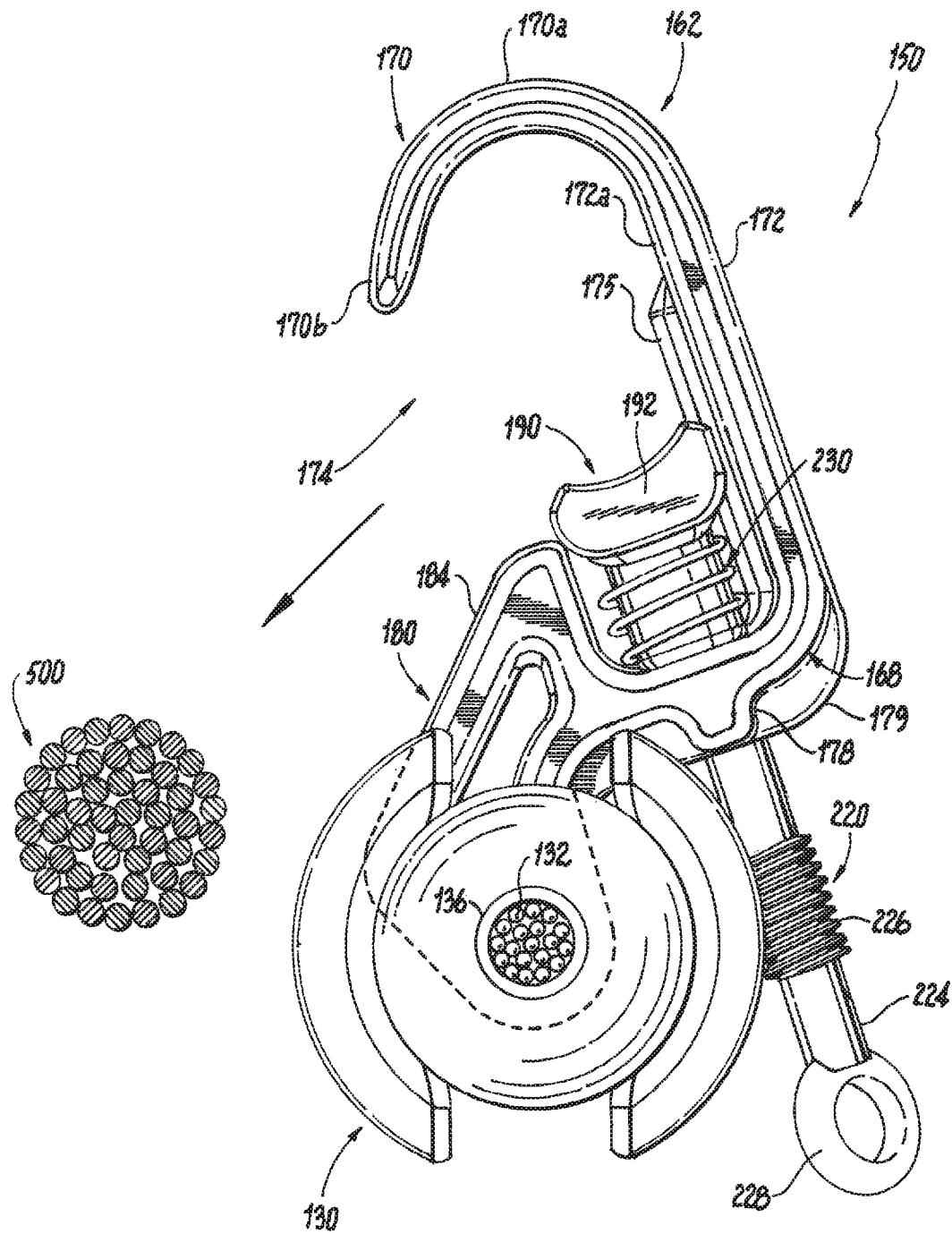
FIG. 19 is a side elevation view of the damper clamp of FIG. 14, illustrating the damper clamp being aligned for installation on a conductor.
Figure 20:
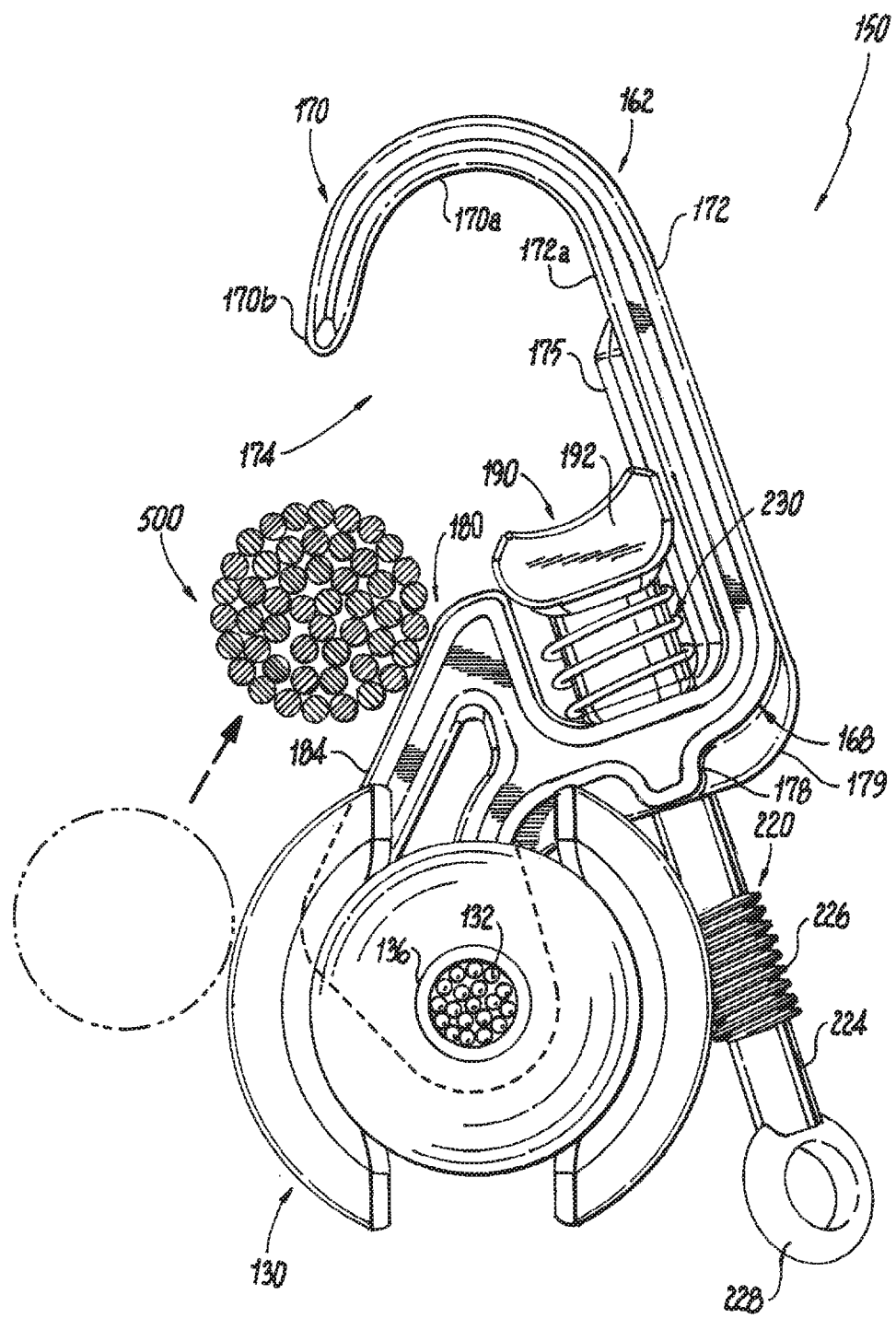
FIG. 20 is a side elevation view of the damper clamp and conductor of FIG. 19, illustrating the conductor being guided along a lead-in of the body of the clamp assembly toward a conductor receiving opening in the clamp assembly.
Figure 21:
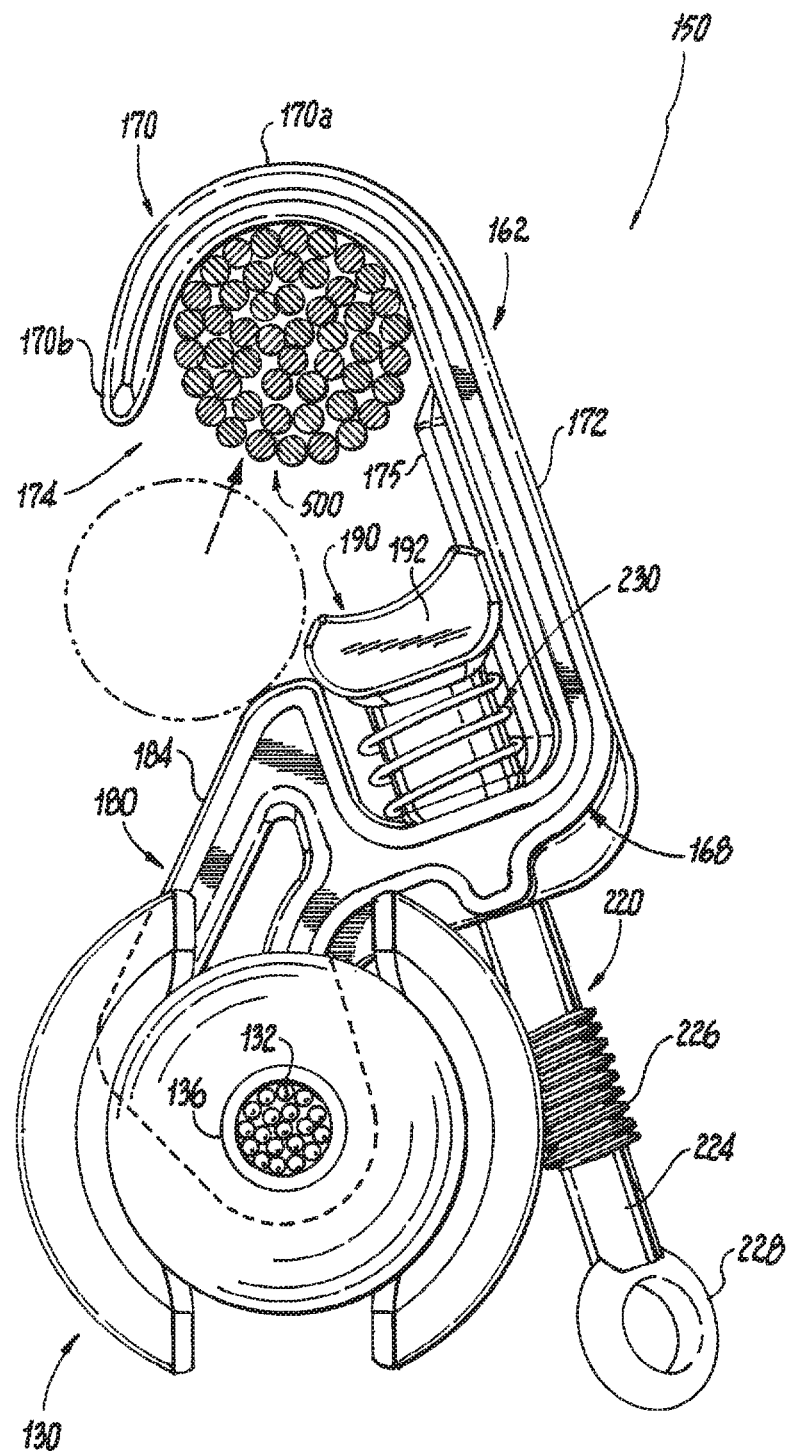
FIG. 21 is a side elevation view of the damper clamp and conductor of FIG. 20, illustrating the conductor passing into the conductor receiving opening and resting in a seat of the clamp assembly.
Figure 22:
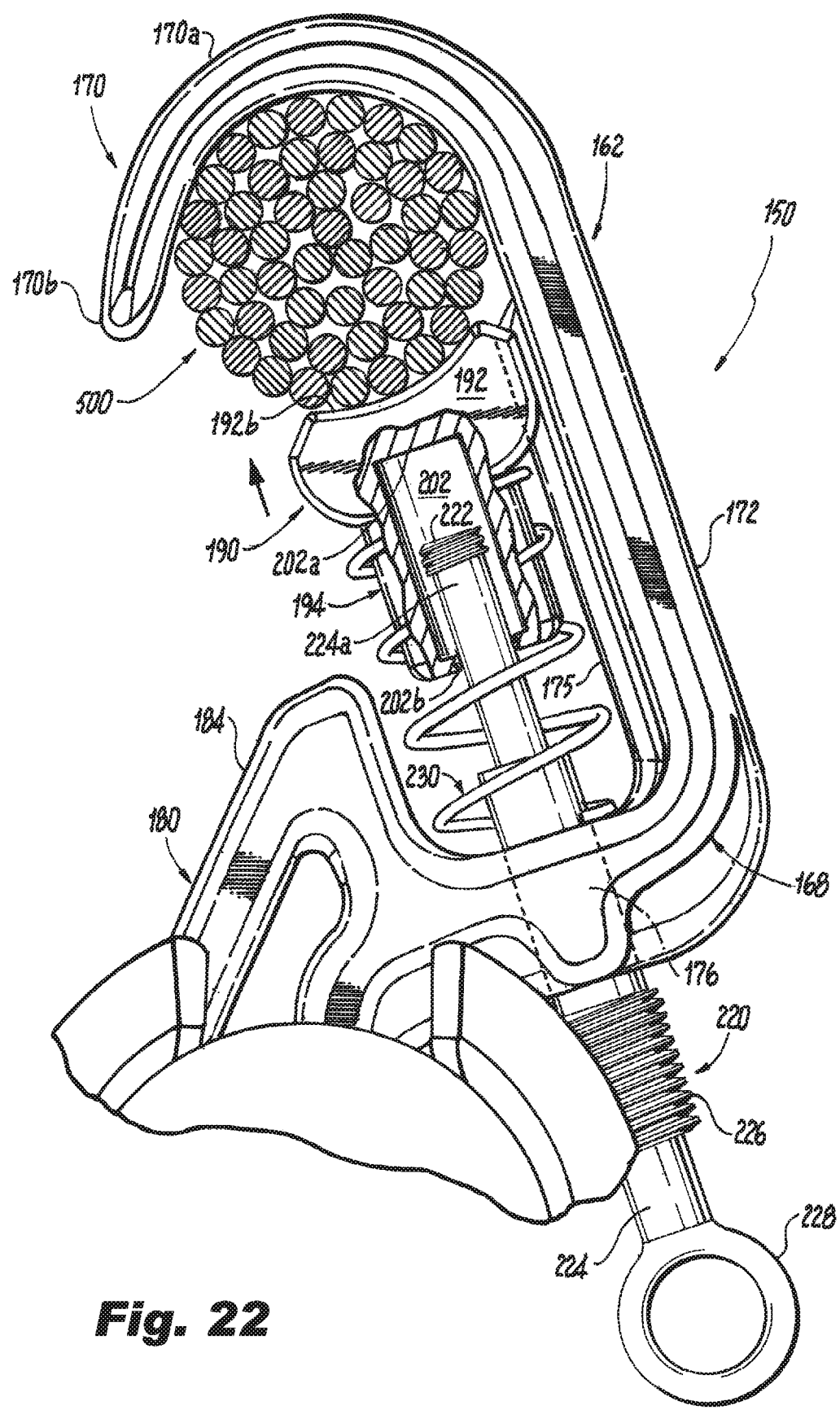
FIG. 22 is a side elevation view of the damper clamp and conductor of FIG. 21, illustrating the conductor resting in the seat and the keeper of the clamp assembly in the clamping position and the spring of the clamp assembly temporarily securing the conductor to the clamp assembly.
Figure 23:
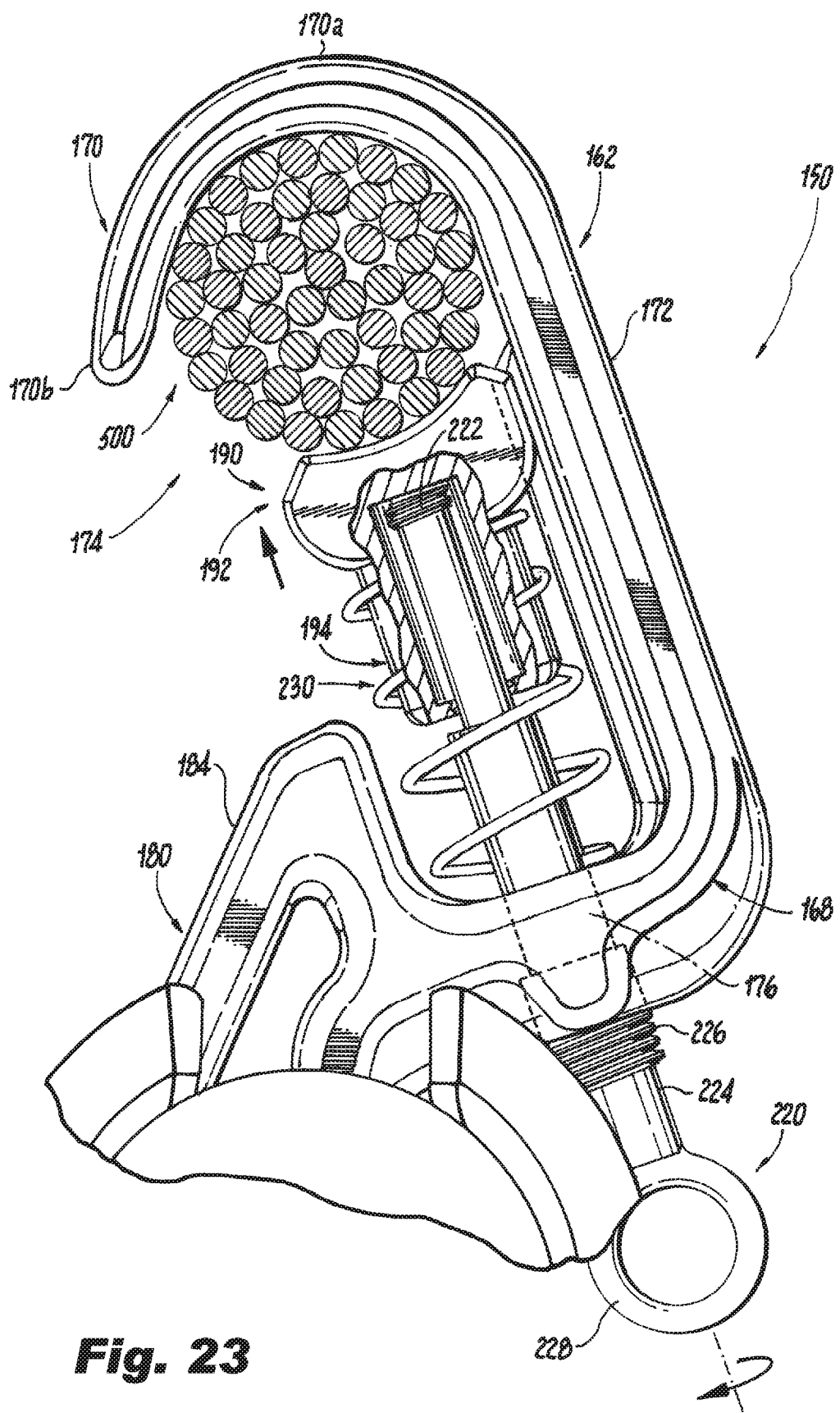
FIG. 23, is a side elevation view of the damper clamp and conductor of FIG. 22, illustrating the conductor resting in the seat and the keeper of the clamp assembly in the clamping position with a stem of the damper clamp tightened to releasably secure the conductor to the clamp assembly.

Referring now to FIGS. 19-24, installation of the damper clamp 150 on an overhead conductor 500 spanning two utility poles from the ground will be described using a hot stick as the extensible reach tool. Initially, a lineman (or other service technician) positions the hot stick near the tool mounting member 228 and opens a retractable hook at the crown of the hot stick (not shown) using an operating mechanism (not shown) on the hot stick to grasp the tool mounting member 228. The lineman then retracts the hook into the hot stick using the operating mechanism so that the tool mounting member 228 and shaft 224 of the stem 220 slide into the hot stick until the crown of the hot stick contacts the base 168 of the body 162 and engages the first and second protruding foot members 178 and 179, as is known. Retracting the stem 220 into the hot stick pulls the stem 220 moving the keeper 190 to the open position compressing spring 230 so that the keeper 190 is at least partially resting in the keeper channel 181, as seen in FIG. 19. The hot stick is then hoisted toward the overhead conductor 500 so that the seat 170 of the body 162 extends above the conductor 500 as seen in FIG. 19. The lineman then lowers the hot stick toward the conductor 500 so that the conductor begins to enter the conductor receiving opening 174 in the clamp assembly 160 as seen in FIG. 20. As the lineman lowers the hot stick, the conductor 500 may contact the lead-in surface 184 of the damper bracket 180 which helps to guide the conductor into the conductor receiving opening 174 of the clamp assembly 160 as seen in FIGS. 20 and 21. The lineman further lowers the hot stick so that the conductor 500 enters the conductor receiving opening 174 of the clamp assembly 160 and comes to rest in the seat 170 of the body 162 of the clamp assembly 160, as seen in FIG. 21. With the conductor 500 resting in the seat 170, the lineman then releases the operating mechanism of the hot stick so that the stem 220 is free to move. With the stem 220 free to move, tension on the spring 230 is released permitting the spring to bias the keeper 190 toward the seat 170, i.e., toward the clamping position, seen in FIG. 22. In this exemplary embodiment, the conductor 500 has a sufficiently large outer diameter, for example, the diameter of a 2312 Kcmil size cable, such that when the spring 230 biases the keeper 190 toward the seat 170, the top surface 192*b* of the pressure plate 192 of the keeper 190 contacts the conductor 500 before the spring 230 fully returns to its normal unbiased state. As such, the keeper coupling member 222 is at a point within the pocket 202 between the top end 202*a* and the bottom end 202*b* as seen in FIG. 22. At this point, the keeper 190 temporarily holds the conductor 500 within the seat 170. The lineman can then rotate the stem 220 so that the fastening member 226 on the shaft 224 enters the aperture 176 in the base 168 of the body 162 until the keeper coupling member 222 contacts the top end 202*a* of the pocket 202, seen in FIG. 23. Further rotation of the stem 224 is then translated to linear motion of the keeper 190 so that the pressure plate 192 of the keeper 190 presses against the conductor 500 to further tighten the conductor within the clamp assembly 160 and thus releasably securing the conductor to the damper clamp 150. Rotation of the stem 224 in the opposite direction facilitates removal of the conductor from the damper clamp 150.

Figure 24:
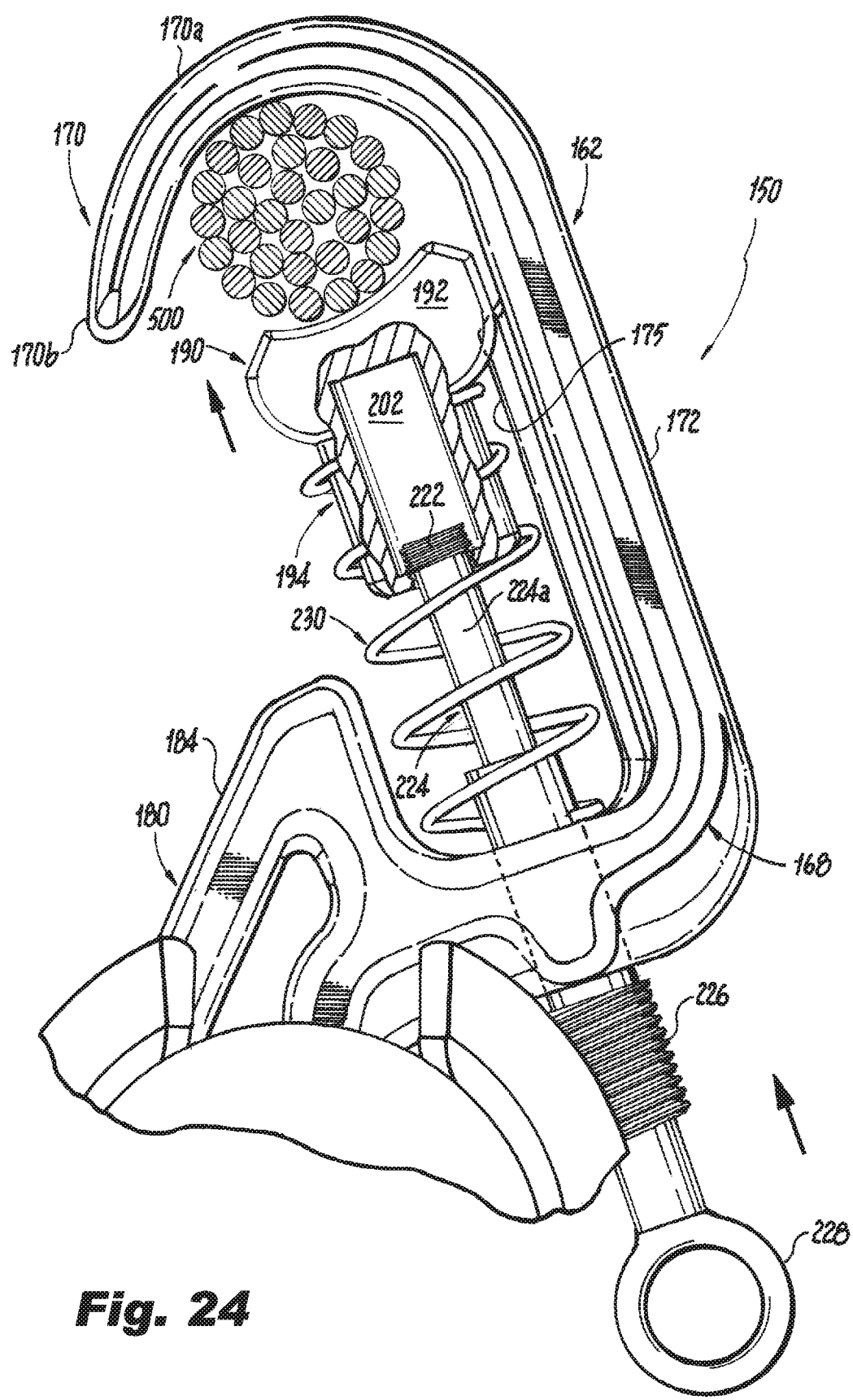
FIG. 24 is a side elevation view of the damper clamp and a conductor having a smaller outer diameter than the conductor of FIG. 19, illustrating the smaller diameter conductor resting in the seat and the keeper of the clamp assembly in the clamping position and the spring of the clamp assembly temporarily securing the conductor to the clamp assembly.

In the event the conductor 500 has a smaller outer diameter, for example the diameter of a 1431 Kcmil size cable, when the spring 230 biases the keeper 190 toward the seat 170, the top surface 192b of the pressure plate 192 contacts the conductor 500 when the spring 230 fully returns to its normal unbiased state. As such, the keeper coupling member 222 is adjacent the bottom end 202b of the pocket 202 as seen in FIG. 24. At this point, the keeper 190 temporarily holds the smaller conductor 500 within the seat 170. The lineman can then rotate the stem 220 so that the fastening member 226 on the shaft 224 enters the aperture 176 in the base 168 of the body 162 until the keeper coupling member 222 contacts the top end 202a of the pocket 202. Further rotation of the stem 224 is then translated to linear motion of the keeper 190 so that the pressure plate 192 of the keeper presses against the smaller conductor 500 to further tighten the conductor within the clamp assembly 160 and thus releasably securing the smaller conductor to the damper clamp 150. Rotation of the stem 224 in the opposite direction facilitates removal of the conductor from the damper clamp 150.

Figure 25:
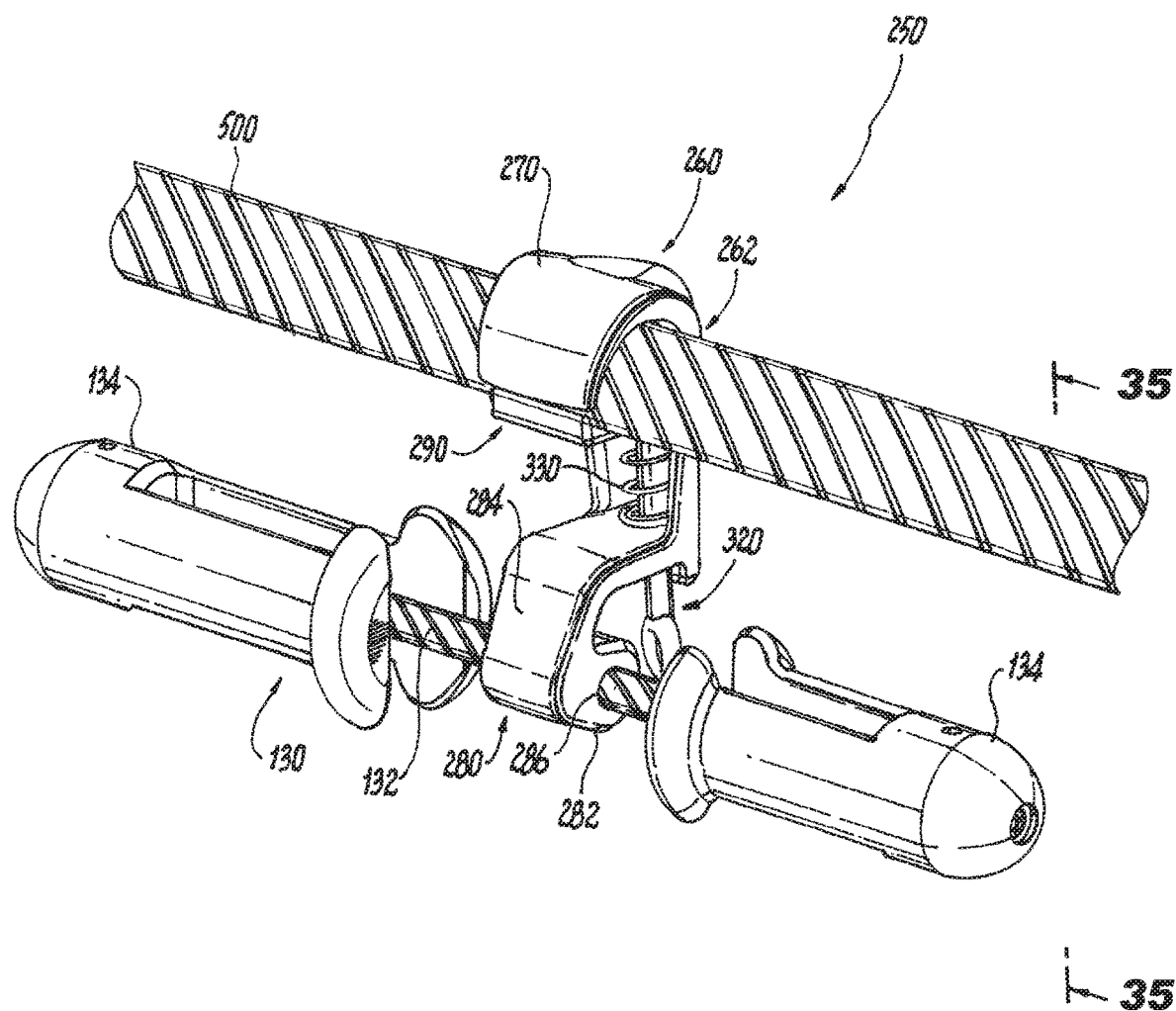
FIG. 25 is a perspective view of another exemplary embodiment of a damper clamp according to the present disclosure releasably secured to a conductor, and illustrating a clamp assembly in a clamping position and a damper assembly extending from the clamp assembly.

Referring now to FIG. 25, another exemplary embodiment of a damper clamp according to the present disclosure secured to a conductor is shown. The damper clamp 250 includes a clamp assembly 260 and a damper assembly 130, which is similar to the damper assembly 130 described above and for ease of description is not repeated. The clamp assembly 260 is configured to be installed on a conductor 500 and the damper assembly 130 is secured to, or integrally or monolithically formed into the clamp assembly 260.

Referring now to FIGS. 26-31, another exemplary embodiment of the clamp assembly 260 of the damper clamp 250 will be described. The clamp assembly 260 has a body 262, a keeper 290, a stem 320, a first spring 330 and an optional second spring 340, seen in FIG. 30. For general reference purposes, the body 262 has a conductor holding portion 264 and a damper holding portion 266, seen in FIG. 28. The body 262 may be a unitary body or may include multiple components secured to each other using, for example, mechanical or adhesive fasteners or welds. For example, the conductor holding portion 264 and the damper holding portion 266 may be formed as a unitary or monolithic structure, or the conductor holding portion 264 and the damper holding portion 266 may be separate components that are secured together. In the exemplary embodiment shown the conductor holding portion 264 and the damper holding portion 266 are formed as a monolithic structure.

Figure 27:
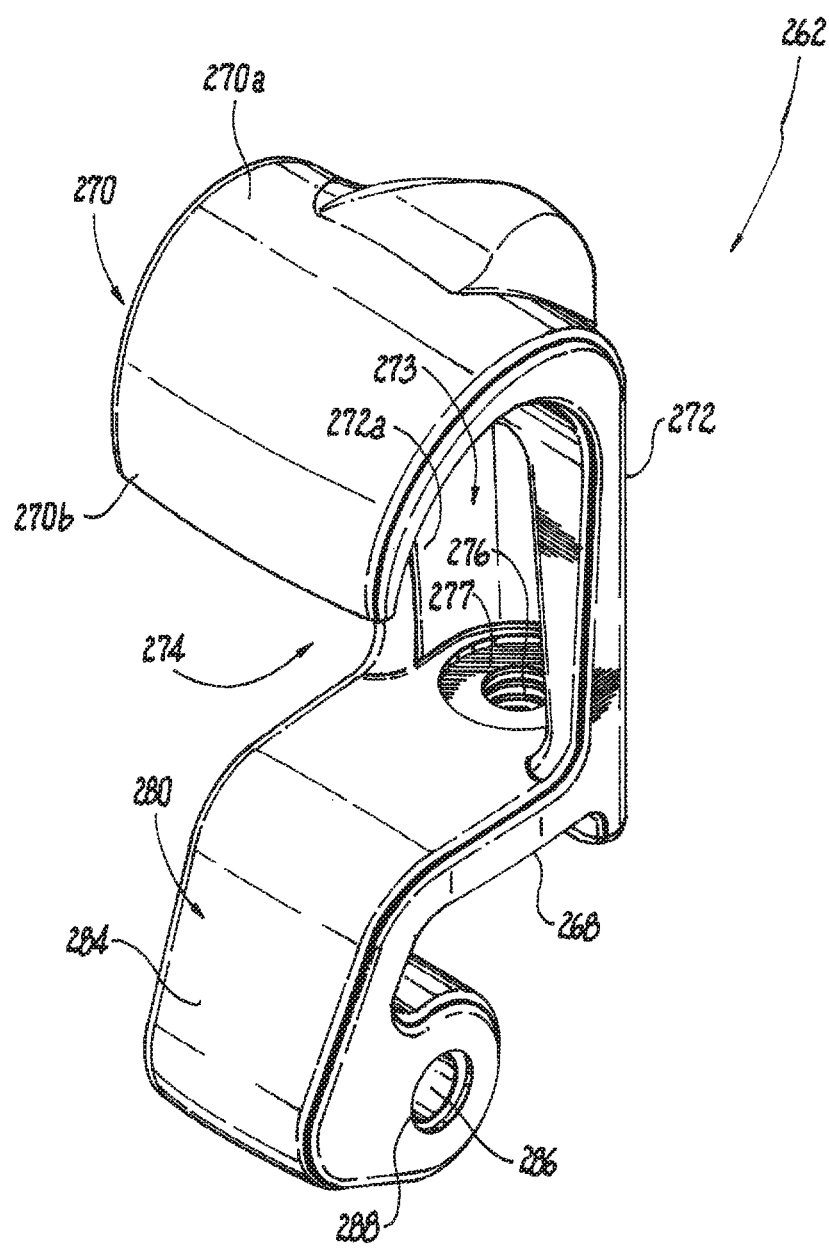
FIG. 27 is a top perspective view of a body of the clamp assembly of FIG. 26.
Figure 28:
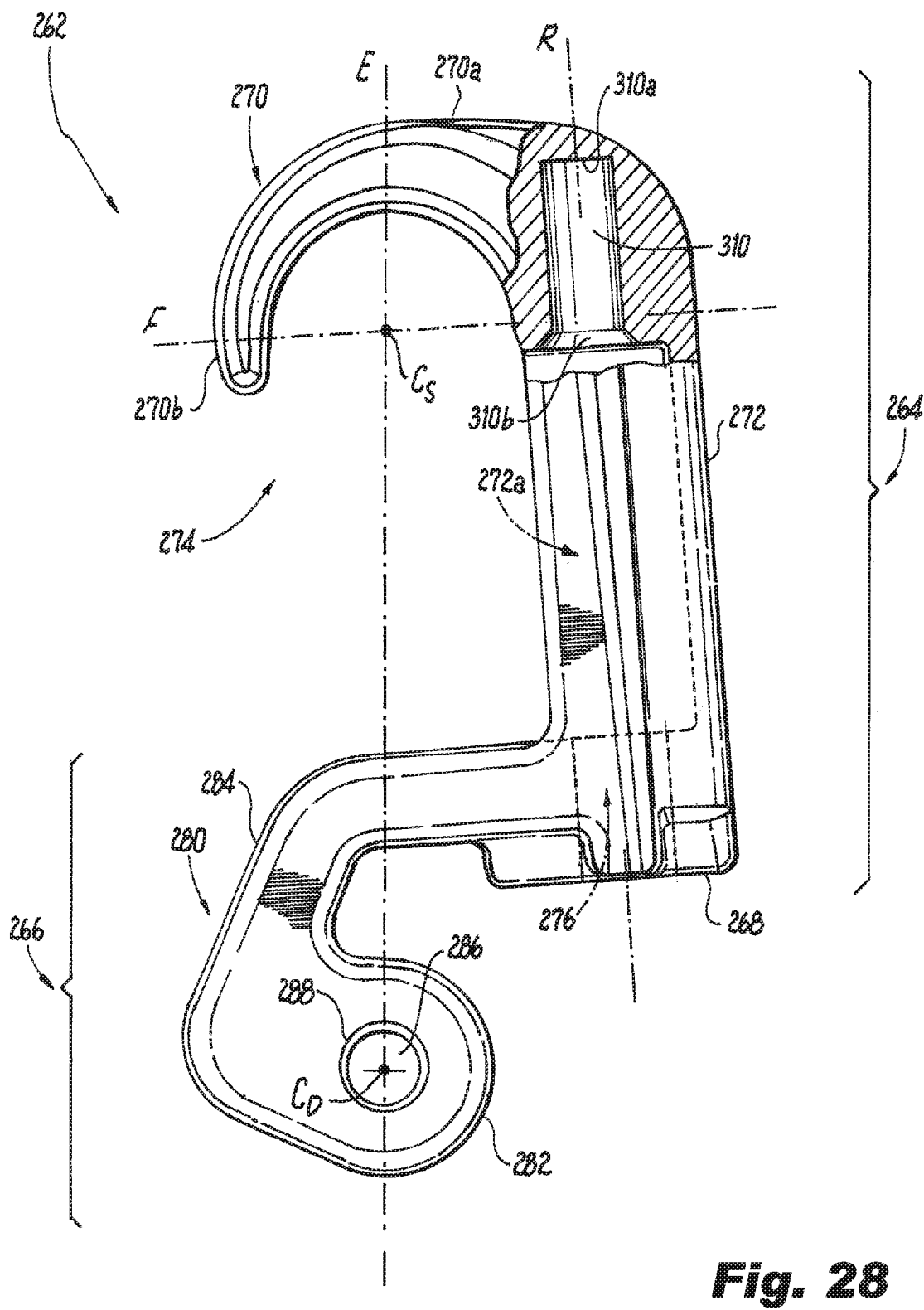
FIG. 28 is a side elevation view in partial cross-section of the body of the clamp assembly of FIG. 27.
Figure 31:
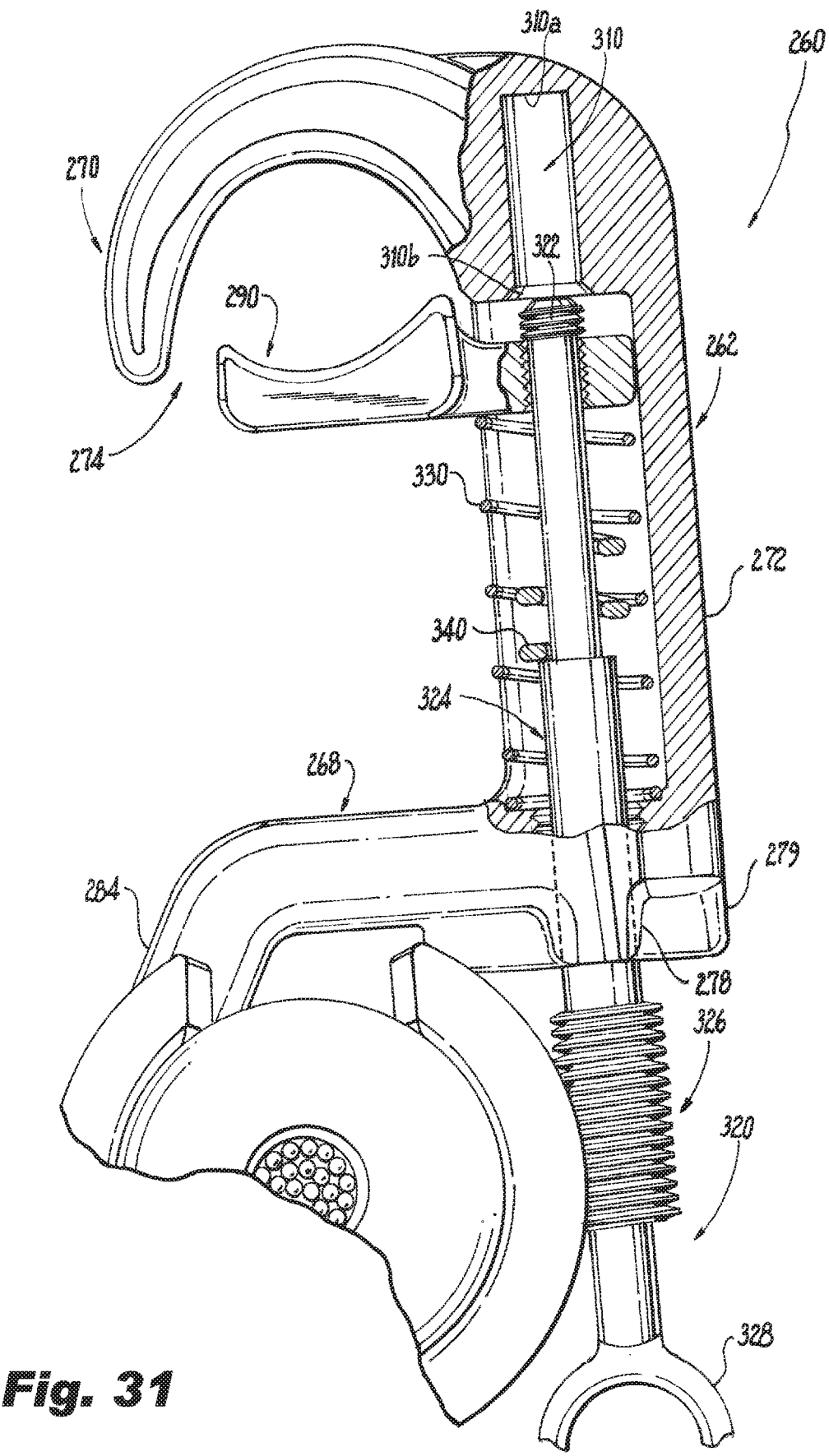
FIG. 31 is a side elevation view of a conductor holding portion of the damper clamp of FIG. 26, illustrating the clamp assembly in a clamping position where the keeper is coupled to a stem and biased toward the clamping position by a spring.

Referring to FIGS. 27, 28 and 31, in this exemplary embodiment, the conductor holding portion 264 includes base 268, seat 270 and wall 272 between the base 268 and the seat 270. The base 268, seat 270 and wall 272 also define a conductor receiving opening 274. The base 268 of the body 262 has an aperture 276, e.g., a threaded aperture, configured to receive a keeper coupling member 322 on the shaft 324 of the stem 320 and the shaft as described in more detail below. Around the aperture 276 is a counterbore 277 configured to receive one end of the first spring 330. The base 268 of the body 262 also has a first protruding foot member 278, seen in FIG. 31, which is similar to the first protruding foot member 44 described above. The first protruding foot member 278 may extend along a width of the base 268 including the aperture 276. It is noted that the width of the base 268 is similar to the width "W" described above. In another embodiment, the first protruding foot member 278 may be a plurality of protruding foot members spaced apart along the width "W" of the base 268. The first protruding foot member 278 is used when coupling the damper clamp 250 to, for example, a crown of an extensible reach tool (not shown) when installing the damper clamp on a conductor 500. The base 268 of the body 262 may also include a second protruding foot member 279, seen in FIG. 31, which is similar to the second protruding foot member 46 described above. The second protruding foot member 279 may extend along a length of the base 268 including the aperture 276. It is noted that the length of the base 268 is similar to the length "L" described above. As such, the first protruding foot member 278 may intersect the second protruding foot member 279. In another embodiment, the second protruding foot member 279 may be a plurality of protruding foot members spaced apart along the length "L" of the base 268. The second protruding foot member 279 is also used when coupling the damper clamp 250 to, for example, a crown of an extensible reach tool when installing the damper clamp 250 on a conductor 500.

Continuing to refer to FIGS. 27, 28 and 30, the seat 270 of the body 262 is shaped to receive a portion of a conductor, e.g., conductor 500 seen in FIG. 25, and to temporarily rest on the conductor 500 until the keeper 290 is biased to a clamping position by spring 330 and tightened as described below. In the exemplary embodiment shown, the seat 270 is an arcuate structure, e.g., a C-shaped structure, having an arcuate portion 270a and an overhang portion 270b. The arcuate portion 270a is generally represented by line F extending from the wall 272. The overhang portion 270b extends from the arcuate portion 270a as shown. The overhang portion 270b helps maintain the damper clamp 250 on the conductor 500 when installing the damper clamp. The portion of the seat 270 joined to the wall 272 includes a pocket 310. In the embodiment shown, the pocket 310 is a cylindrical shaped pocket configured to receive the keeper coupling member 322 at the distal end portion 324a of the shaft 324 of the stem 320, seen in FIGS. 28 and 30. The pocket 310 includes a top end 310a and a bottom end 310b. The bottom end 310b of the pocket 310 is beveled to help align the keeper coupling member 322 with the pocket 310 when the keeper 290 is moving to the clamping position. To further help align the align the keeper coupling member 322 with the pocket 310 when the keeper 290 is moving to the clamping position, the outer surface of the keeper coupling member 322 may be rounded to minimize edges that my contact the beveling at the bottom end of the pocket 310. The pocket 310 permits the keeper 290 to move relative to the shaft 324 of the stem 320 to move relative to the keeper 290. For example, the shaft 324 of the stem 320 may rotate relative to the keeper 290, and/or the keeper 290 may move along a longitudinal axis "R" of the pocket 310, seen in FIG. 28, between the top end 310a and the bottom end 310b. Therefore, the present disclosure contemplates that the pocket 310 can come in any shape that can receive the keeper coupling member 322 of the shaft 324 and that permits the keeper 290 to move relative to the shaft 324 of the stem 320.

The wall 272 of the body 262 is, in this exemplary embodiment, substantially perpendicular to the base 268. The wall 272 includes a rounded interior wall 272a that extends around the counterbore 277 surrounding the aperture 276 in the base 268. The rounded interior surface 272a extends from the base 268 to the portion of the seat 270 joined to the wall 272 adjacent the pocket 310 and forms a bracket receiving channel 273 as shown in FIGS. 27 and 28.

The bracket receiving channel 273 is configured to receive the stem bracket 294 extending from the pressure plate 292 of the keeper 290 and to guide the keeper as it moves between the open position and the clamping position. With the stem bracket 294 within the bracket receiving channel 273, the stem 320 within the aperture 276 in the base 268 is offset from the damper assembly 130 so that the stem 320 can be coupled to an extendible reach tool without interference from the damper assembly 130. The rounded interior surface 272a also interacts with the keeper 290 to limit rotation of the keeper when the keeper is moving between the open position and the clamping position, as described below.

Continuing to refer to FIGS. 27 and 28, in this exemplary embodiment, the damper holding portion 266 of the body 262 includes damper bracket 280 extending from a front side of the base 268. The damper bracket 280 includes a damper holder member 282. An upper surface 284 of the damper bracket 280 that is closest to the conductor receiving opening 274 is angled to form a lead-in that helps guide a conductor 500 into the conductor receiving opening 274. The damper holder member 282 includes an aperture 286 and a sleeve 288 secured within the aperture 286 that is capable of receiving a weight holding member 132, e.g., a messenger wire seen in FIGS. 25 and 26, of the damper assembly 130 as described above. The sleeve 288 is preferably press fit within the aperture 286, but the sleeve 288 may also be secured within the aperture 286 using mechanical or adhesive fasteners or welds, or the sleeve 288 may be cast into the damper holder member 282. As seen in FIG. 28, the sleeve 288 of the damper holder member 282 is positioned so that the center $C_D$ of the sleeve 288 is vertically in-line with the center $C_S$ of the seat 270, generally represented by dotted line E. With the center $C_D$ of the sleeve 288 vertically in-line with the center $C_S$ of the seat 270, the center of gravity of the damper clamp 250 is the same as $C_D$ and the damper clamp is balanced so that the conductor 500 remains within the seat 270 of the body 262 as the damper clamp 250 is mounted to a conductor 500 and as the keeper 290 is biased toward the clamping position and secured to the conductor.

As noted above, the clamp assembly 260 includes a keeper 290. Referring to FIGS. 27-30, the keeper 290 is configured to fit within the conductor receiving opening 274 of the conductor holding portion 264. In this exemplary embodiment, the keeper 290 includes a pressure plate 292 and a stem bracket 294. The pressure plate 292 has a bottom surface 292a, a top surface 292b, a first side wall 296 and a second side wall 298. The stem bracket 294 extends from the first side wall 296 of the pressure plate 292 into the bracket receiving channel 273 as noted above. The stein bracket 294 has a stem receiving aperture 300 through which the distal end 324a of the stem 324 can pass. The pressure plate 292 and stem bracket 294 may be a unitary or monolithic structure, or may include multiple components secured to each other using, for example, mechanical or adhesive fasteners or welds. In the exemplary embodiment shown, the pressure plate 292 and the stem bracket 294 are formed as a monolithic structure.

Figure 29:
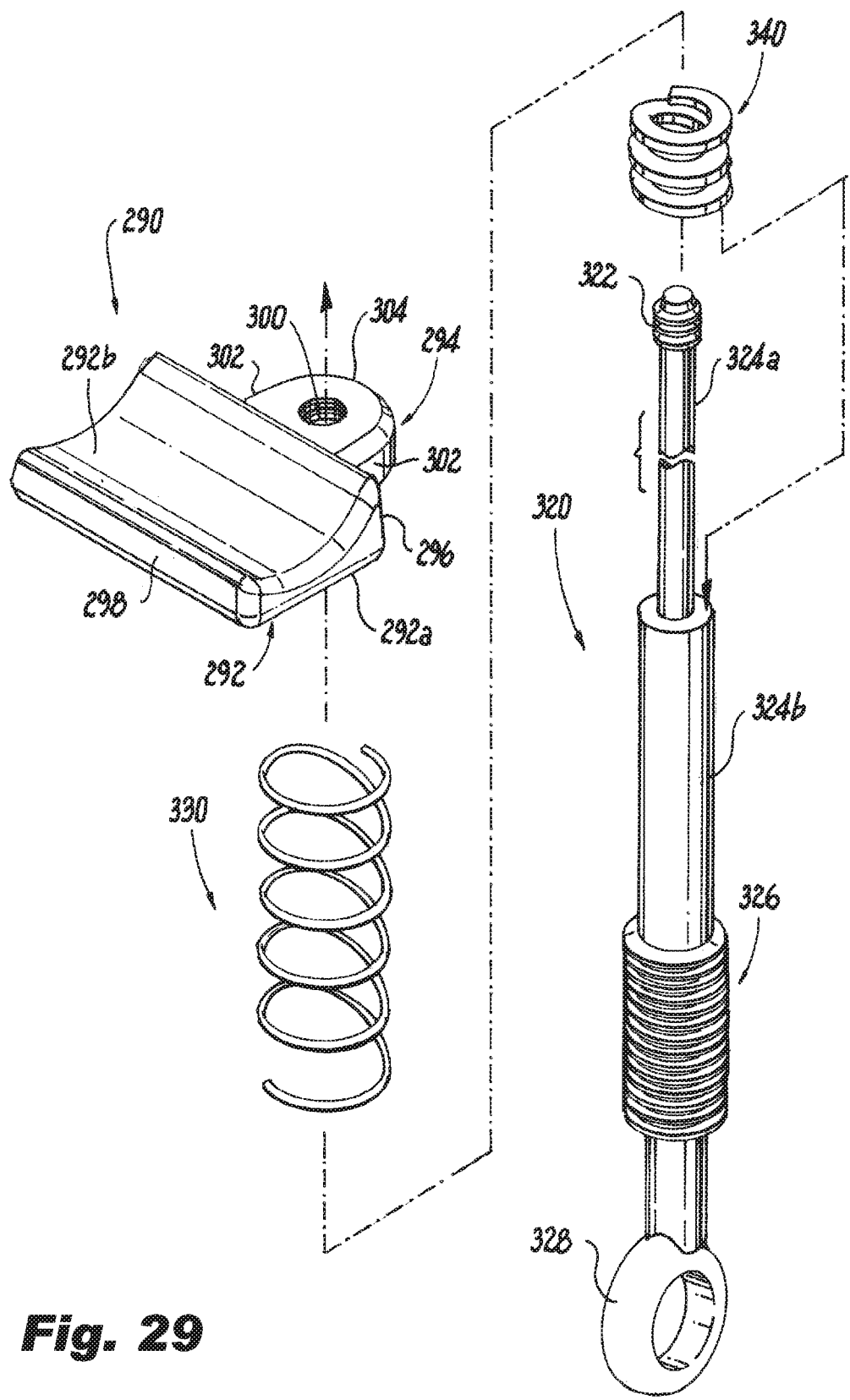
FIG. 29 is a top perspective view with parts separated of another exemplary embodiment of the keeper, stem and springs of the damper clamp of FIG. 26.
Figure 30:
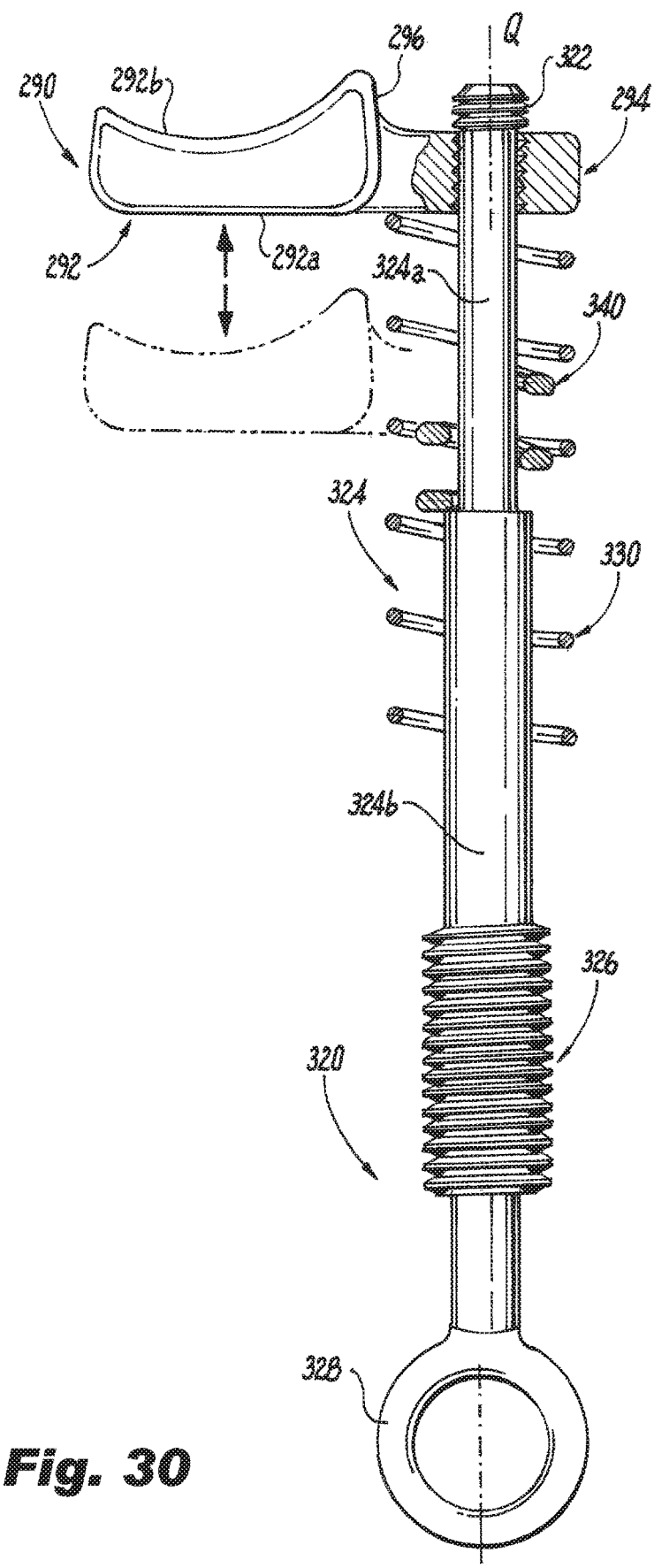
FIG. 30 is side elevation view of the keeper, stem and springs of FIG. 29 and illustrating a distal end of the stem passing through an opening in the keeper.

Continuing to refer to FIGS. 29 and 30, the pressure plate 292 has a top surface 292b that is arcuate in shape to form a conductor groove that faces the seat 270 of the body 262. The top surface 292b of the pressure plate 292 may include a plurality of teeth or knurling to better grip a conductor contacting the top surface 292b. In the exemplary embodiment shown, a first side wall 296 of the pressure plate 292 may be larger or thicker than an opposite second side wall 298 of the pressure plate 292. The first side wall 296 helps to better position the conductor 500 within the seat 270 when the keeper 290 is in the clamping position. The second side wall 298 of the pressure plate 292 may include a beveled edge (not shown) between the side wall 298 and the top surface 292b which may help minimize and possibly prevent the keeper 290 from interfering with the conductor 500 as it enters the conductor receiving opening 274. It is noted that the present disclosure also contemplates that the side walls 296 and 298 can be symmetrical.

As noted, the stem bracket 294 of the keeper 290 extends from the first side wall 296 of the pressure plate 292 and is configured to fit within the bracket receiving channel 273. In this exemplary embodiment, the stem bracket 294 has a pair of legs 302 extending from the first side wall 296 of the keeper and a rounded side wall 304 between the pair of legs 302. The pair of legs 302 and the rounded side wall 306 conform to the shape of the rounded interior surface 272a of the wall 272 defining the bracket receiving channel 273 so that the aperture 300 aligns with the aperture 276 in the base 268. The aperture 300, e.g., a threaded aperture, in the stem bracket 294 receives the distal end 324a of the shaft 324 of the stem 320, as seen in FIG. 30. In this exemplary embodiment, the aperture 300 is a threaded cylindrical aperture.

Figure 26:
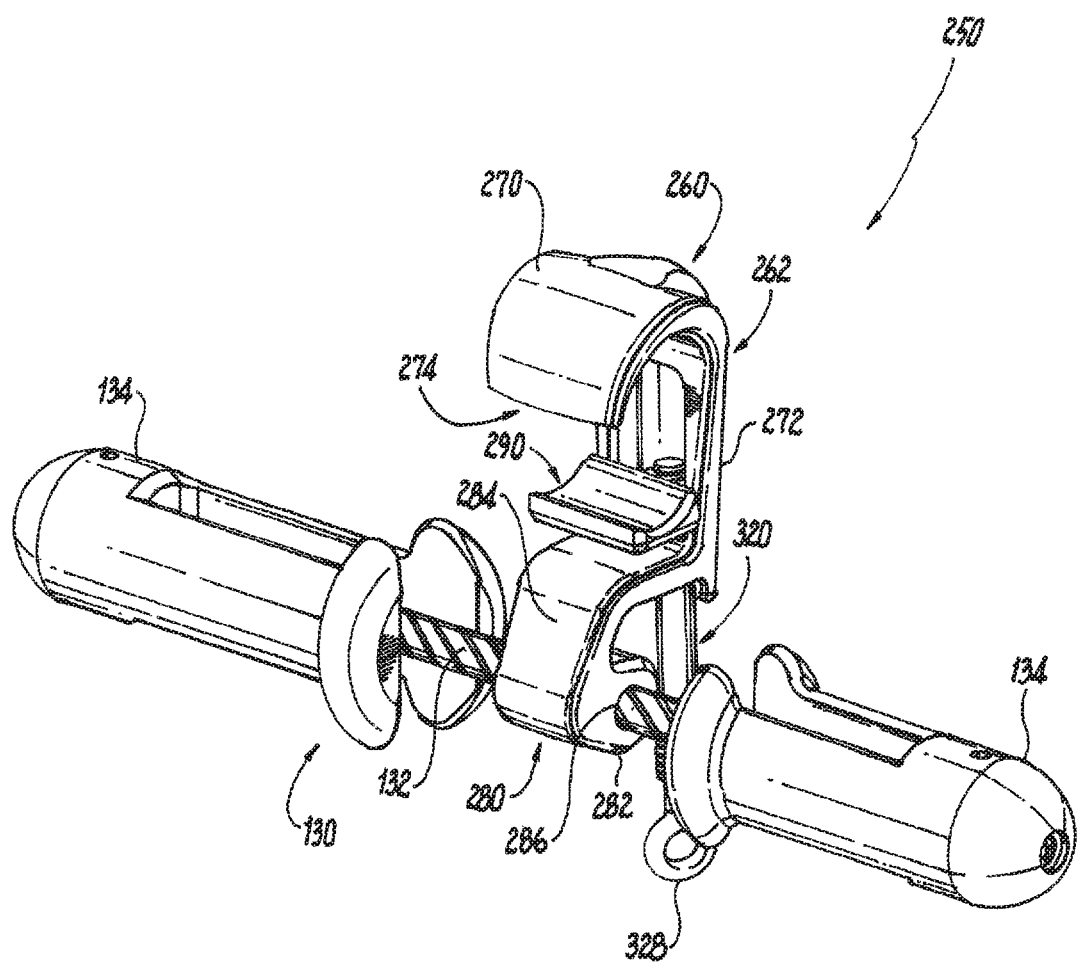
FIG. 26 is a perspective view of the damper clamp of FIG. 25 without the conductor, and illustrating the clamp assembly in an open position and a damper assembly extending from the clamp assembly.

Turning to FIGS. 26 and 31, the keeper 290 is movable within the conductor receiving opening 274 of the clamp assembly body 262 between an open position, seen in FIG. 26, where a conductor 500 can be received within the conductor receiving opening 274 between the seat 270 and the top surface 292b of the pressure plate 292 of the keeper 290, and a clamping position, seen in FIG. 31, where a conductor can be clamped or secured between the seat 270 and the top surface 292b of the pressure plate 292.

Referring to FIG. 30, the stem 320 is preferably an eye-stem. As noted above, the stem 320 includes a shaft 324 having a keeper coupling member 322, a fastening member 326, and a tool mounting member 328. The shaft 324 has a distal end portion 324a and a proximal end portion 324b. The diameter or outer periphery of the distal end portion 324a may be less than the diameter or outer periphery of the proximal end portion 324b. In the exemplary embodiment shown, the distal end portion 324a has a smaller diameter or outer periphery than the proximal end portion 324b. The smaller diameter or outer periphery fits within the aperture 300 in the stem bracket 294. The larger diameter or outer periphery fits within the aperture 276 in the base 268.

The keeper coupling member 322 is attached to, or integrally or monolithically formed at the distal end 324a of the shaft 324. Non-limiting examples of the keeper coupling member 322 include threading at the distal end 324a of the shaft 324 and a boss at the distal end 324a of the shaft 324, where the threading and boss have an outer diameter or periphery that is greater than the outer diameter or periphery of the distal end 324a of the shaft 324, as seen in FIG. 30. In the exemplary embodiment shown, the keeper coupling member 322 includes threading at the distal end 324a of the shaft 324 that passes through the aperture 300 in the stem bracket 294 and is used to couple the keeper 290 to the stem 320 so that the stem can rotate without rotating the keeper 290 and so that the keeper 290 can move along a longitudinal axis "Q" of the stem 324, seen in FIG. 30. As noted above, to further help align the align the keeper coupling member 322 with the pocket 310 when the keeper 290 is moving to the clamping position, the outer surface of the keeper coupling member 322 may be rounded to minimize edges that my contact the beveling at the bottom end of the pocket 310.

The fastening member 326 in this exemplary embodiment includes threads positioned along the shaft 324 and is configured to interact with the threaded aperture 276 in the base 268. The fastening member 326 is used to tighten the keeper 290 against the conductor 500 which tightly secures the conductor within the seat 270 of the clamp body 262 when installed. It is contemplated that the fastening member 326 may be any structure sufficient to tighten the keeper 290 against the conductor 500, which tightly secures the conductor 500 within the seat 270 of the clamp body 262 when installed.

The tool mounting member 328 of the stem 320 is attached to, or integrally or monolithically formed at the proximal end 324b of the shaft 324. Non-limiting examples of the tool mounting member 328 include an eye or looped member. It is noted that the present disclosure contemplates other types of stems. As non-limiting examples, the stem 320 may be a bolt or a break-away bolt.

In the exemplary embodiment of FIGS. 25-31, the first spring 330 is a conventional helical spring that fits around the distal end portion 324a of the shaft 324 of the stem 320 and is positioned between the stem bracket 294 of the keeper 290 and the base 268 of the body 262 so that the bottom end of the first spring 330 rests in the counterbore 277 in the base 268, as shown. The spring 330 normally biases the keeper 290 toward the clamping position, i.e., toward the seat 270 of the body 262, in order to temporarily secure, clamp or hold a conductor 500 positioned within the conductor receiving opening 274 to the seat 270 of the body 262. In addition, the optional second spring 340 is a conventional rigid helical spring that fits around the shaft 324 of the stem 320 and within the first spring 330, as shown in FIG. 30. The second spring 340 is positioned between the stem bracket 294 of the keeper 290 and the larger diameter or out periphery at the proximal end portion 324b of the shaft 324 of the stem 320, as shown. The second spring 340 can be used when tightening the keeper 290 against the conductor 500 as described below.

It is noted that the clamp assembly 260 and damper assembly 130 of the damper clamp 250 according to the present disclosure can be made of a metallic material, a non-metallic material or a combination of metallic and non-metallic materials. Non-limiting examples of metallic materials include aluminum, cast aluminum, galvanized steel or stainless steel. Non-limiting examples of non-metallic materials include rigid plastic materials or composite materials e.g., carbon fiber.

Figure 32:
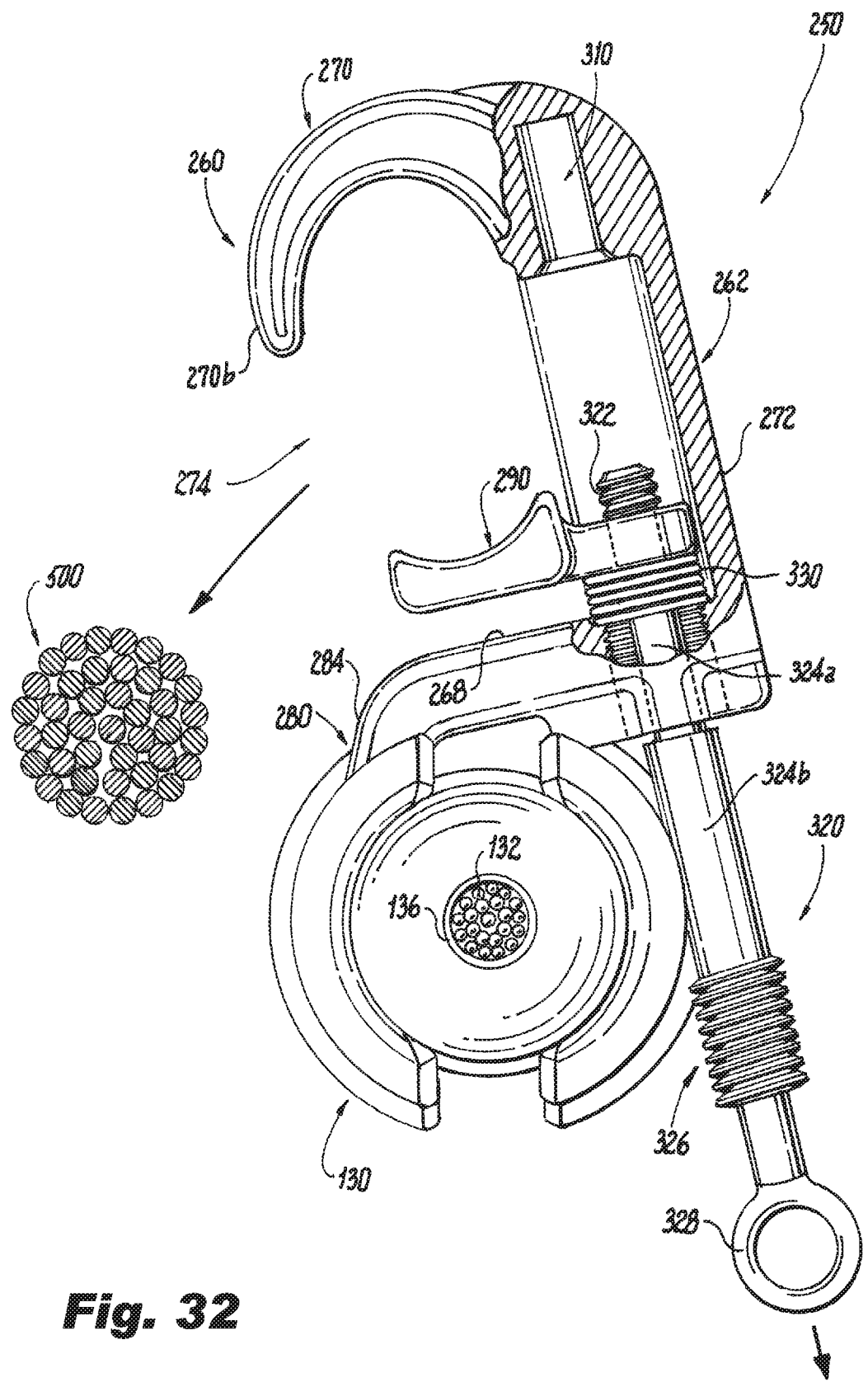
FIG. 32 is a side elevation view of the damper clamp of FIG. 26, illustrating the damper clamp being aligned for installation on a conductor.
Figure 33:
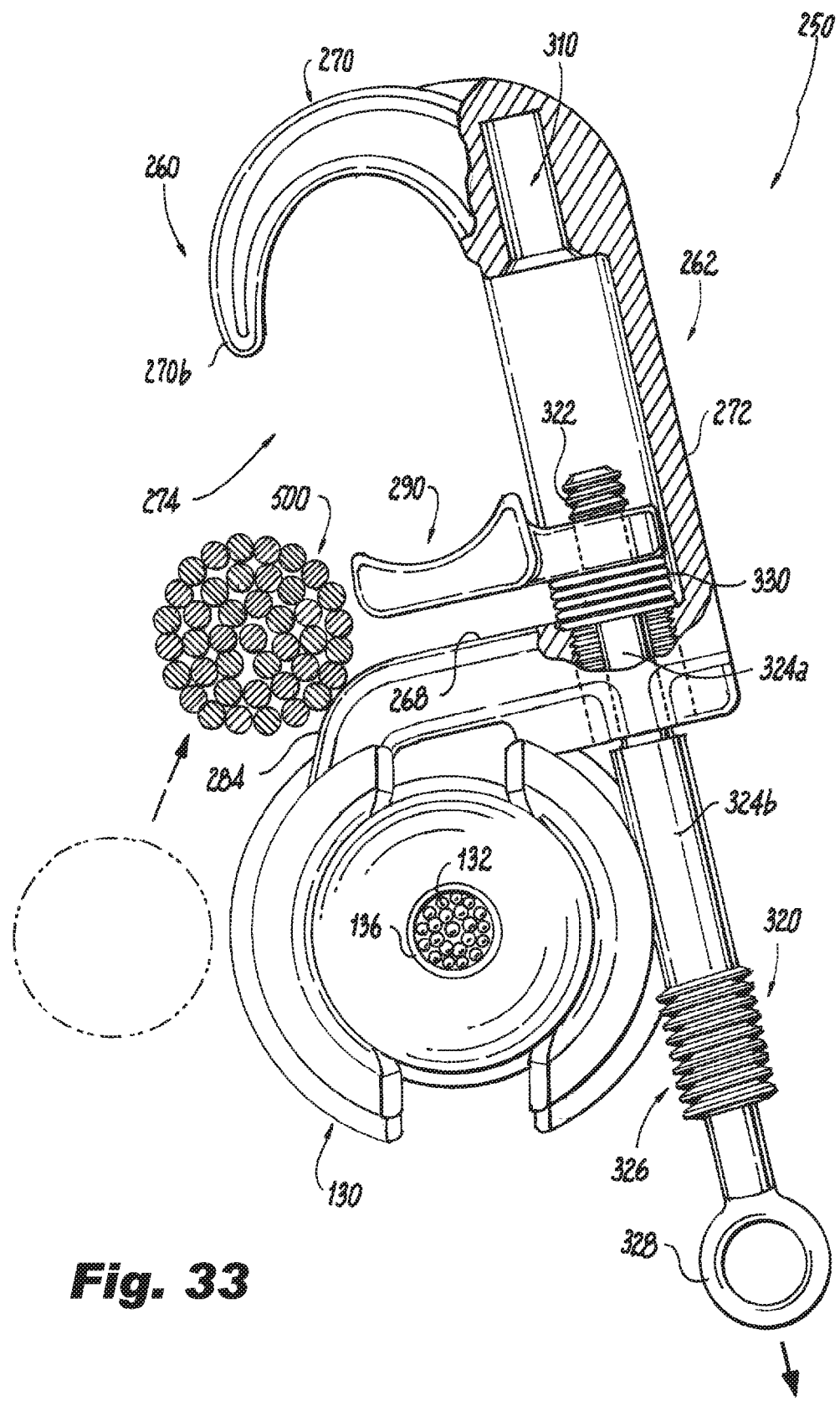
FIG. 33 is a side elevation view of the damper clamp and conductor of FIG. 32, illustrating the conductor being guided along a lead-in of the body of the clamp assembly toward a conductor receiving opening in the clamp assembly.
Figure 34:
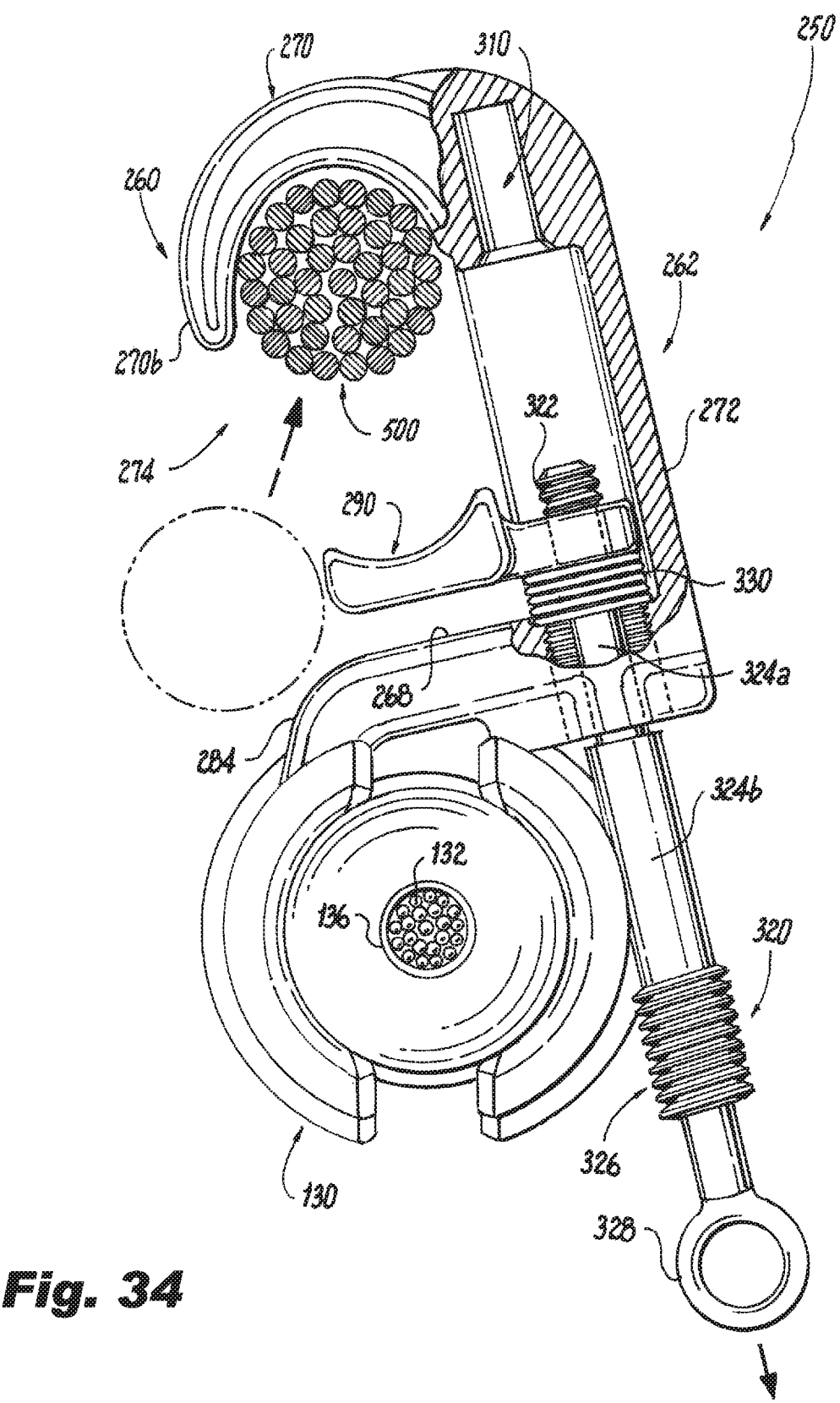
FIG. 34 is a side elevation view of the damper clamp and conductor of FIG. 33, illustrating the conductor passing into the conductor receiving opening and resting in a seat of the clamp assembly.
Figure 35:
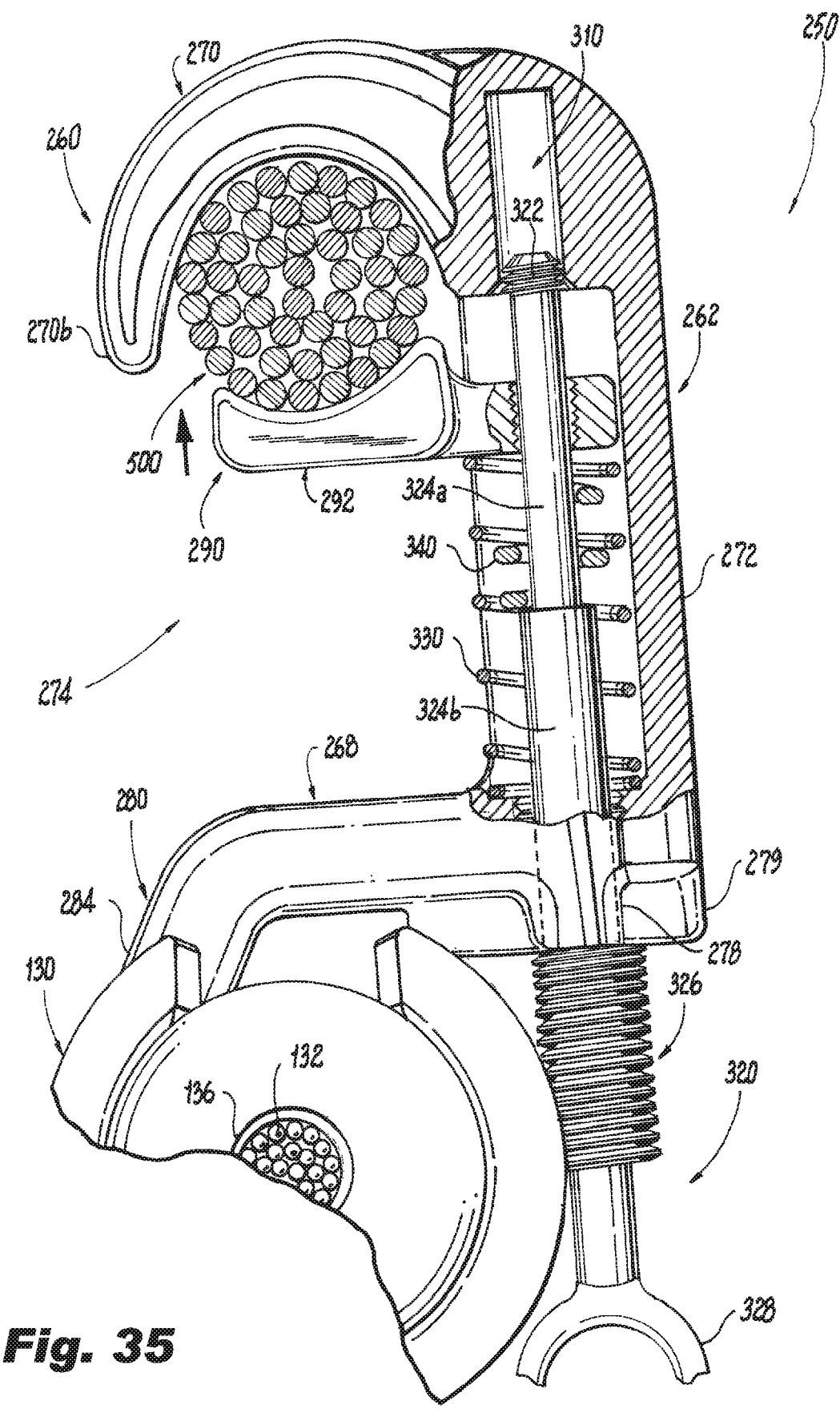
FIG. 35 is a side elevation view of the damper clamp and conductor of FIG. 34, illustrating the conductor resting in the seat and the keeper of the clamp assembly in the clamping position and a spring of the clamp assembly temporarily securing the conductor to the clamp assembly.
Figure 36:
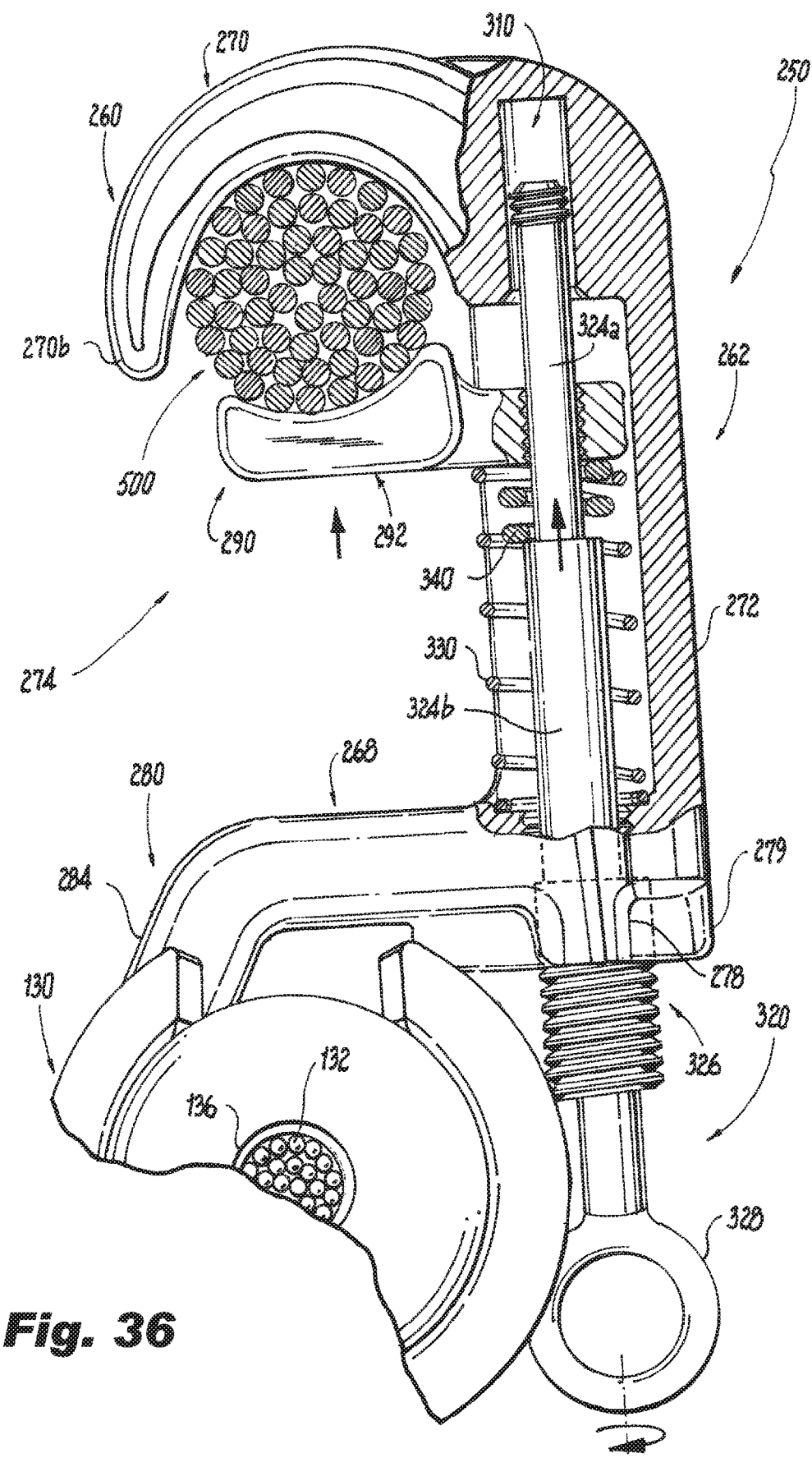
FIG. 36, is a side elevation view of the damper clamp and conductor of FIG. 35, illustrating the conductor resting in the seat and the keeper of the clamp assembly in the clamping position with a stem of the damper clamp tightened to releasably secure the conductor to the clamp assembly.

Referring now to FIGS. 32-37, installation of the damper clamp 250 on an overhead conductor 500 spanning two utility poles from the ground will be described using a hot stick as the extensible reach tool. Initially, a lineman (or other service technician) positions the hot stick near the tool mounting member 328 and opens a retractable hook at the crown of the hot stick (not shown) using an operating mechanism (not shown) on the hot stick to grasp the tool mounting member 328. The lineman then retracts the hook into the hot stick using the operating mechanism so that the tool mounting member 328 and shaft 324 of the stem 320 slide into the hot stick until the crown of the hot stick contacts the base 268 of the body 262 and engages the first and second protruding foot members 278 and 279, as is known. Retracting the stem 320 into the hot stick pulls the stem 320 moving the keeper 290 to the open position compressing spring 330, seen in FIG. 32 so that the keeper 290 is positioned adjacent the base 268, as shown. The hot stick is then hoisted toward the overhead conductor 500 so that the seat 270 of the body 262 extends above the conductor 500 as seen in FIG. 32. The lineman then lowers the hot stick toward the conductor 500 so that the conductor begins to enter the conductor receiving opening 274 in the clamp assembly 260 as seen in FIG. 33. As the lineman lowers the hot stick, the conductor 500 may contact the lead-in surface 284 of the damper bracket 280 which helps to guide the conductor into the conductor receiving opening 274 of the clamp assembly 260 as seen in FIGS. 33 and 34. The lineman further lowers the hot stick so that the conductor 500 enters the conductor receiving opening 274 of the clamp assembly 260 and comes to rest in the seat 270 of the body 262 of the clamp assembly 260, as seen in FIG. 34. With the conductor 500 resting in the seat 270, the lineman then releases the operating mechanism of the hot stick so that the stem 320 is free to move. With the stem 320 free to move, tension on the spring 330 is released permitting the spring to bias the keeper 290 toward the seat 270, i.e., toward the clamping position, seen in FIG. 35. In this exemplary embodiment, the conductor 500 has a sufficiently large outer diameter, for example, the diameter of a 2312 Kcmil size cable, such that when the spring 330 biases the keeper 290 toward the seat 270, the top surface 292b of the keeper 290 contacts the conductor 500 before the spring 330 fully returns to its normal unbiased state. As such, the keeper coupling member 322 is at a point within the pocket 310 between the top end 310a and the bottom end 310b as seen in FIG. 35. At this point, the keeper 290 temporarily holds the conductor 500 within the seat 270. The lineman can then rotate the stem 320 so that the fastening member 326 on the shaft 324 enters the aperture 276 in the base 268 of the body 262, seen in FIG. 36. Further rotation of the stem 324 is then translated to linear motion of the keeper 290 so that the keeper 290 presses against the conductor 500 to releasably secured to the conductor to the damper clamp 250. In the event additional forced is needed to tightly secure the conductor 500 within the seat 270, the second spring 340 may be included and used to apply additional force against the stem bracket 294 of the keeper 290. Rotation of the stem 324 in the opposite direction facilitates removal of the conductor from the damper clamp 250.

Figure 37:
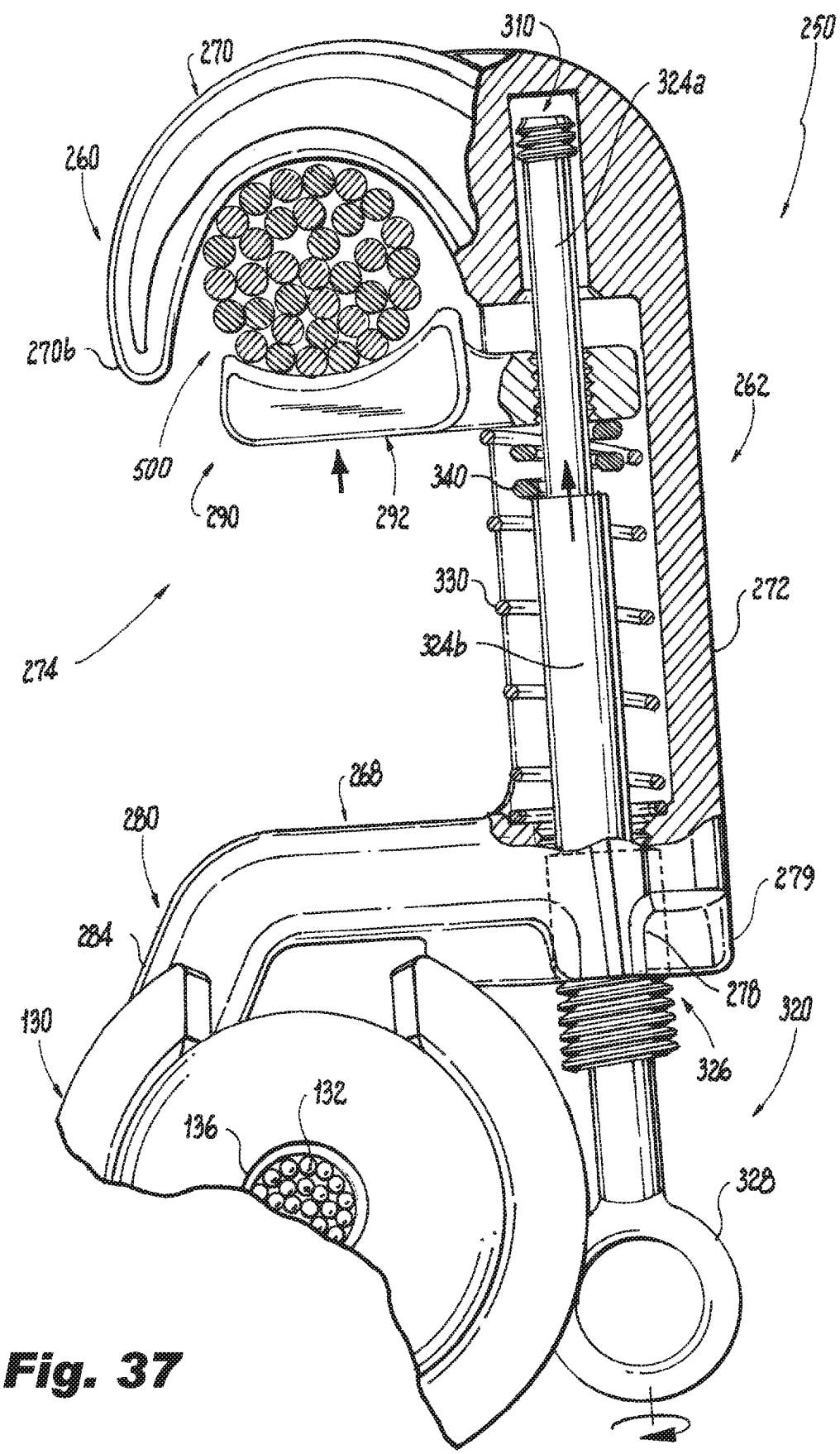
FIG. 37 is a side elevation view of the damper clamp and a conductor having a smaller outer diameter than the conductor of FIG. 25, illustrating the smaller diameter conductor resting in the seat and the keeper of the clamp assembly in the clamping position and a spring of the clamp assembly temporarily securing the conductor to the clamp assembly.

In the event the conductor 500 has a smaller outer diameter, for example the diameter of a 1431 Kcmil size cable, when the spring 330 biases the keeper 290 toward the seat 270, the top surface 292b of the keeper 290 contacts the conductor 500 when the spring 330 fully returns to its normal unbiased state. As such, the keeper coupling member 322 is adjacent the bottom end 310b of the pocket 310 as seen in FIG. 37. At this point, the keeper 290 temporarily holds the smaller conductor 500 within the seat 270. The lineman can then rotate the stem 320 so that the fastening member 326 on the shaft 324 enters the aperture 276 in the base 268 of the body 262. Further rotation of the stem 324 is then translated to linear motion of the keeper 290 so that the keeper 290 presses against the conductor 500 to releasably secured to the smaller conductor to the damper clamp 250. In the event additional forced is needed to tightly secure the conductor 500 within the seat 270, the second spring 340 may be included and used to apply additional force against the stem bracket 294 of the keeper 290.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A damper clamp comprising:
   a clamp assembly comprising:
   a body defining a conductor holding portion and a damper holding portion, wherein the conductor holding portion comprises a base having a stem receiving aperture, a seat and a wall between the base and the seat, wherein the base, seat and wall define a conductor receiving opening, and wherein the damper holding portion includes a lead-in portion and a damper holder member, the lead-in portion extending from the base at an angle relative to the base such that a surface of the lead-in portion is positioned to guide a conductor into the conductor receiving opening, the damper holder member extending from the lead-in portion and includes an aperture that is positioned so that a center of the aperture is vertically in-line with and vertically parallel to a center of the seat;
   a stem extending through the stem receiving aperture in the base and having a keeper coupling member at a first end of the stem and a tool mounting member at a second end of the stem;
   a keeper coupled to the keeper coupling member and movable between an open position permitting a conductor to be received within the conductor receiving opening and a clamping position where the conductor is clamped between the seat and the keeper;
   a spring around the stem between the keeper and the base to normally bias the keeper toward the clamping position to at least temporarily hold the conductor positioned between the seat and the keeper;
   wherein when the keeper is in the clamping position rotational movement of the stem is translated to linear movement of the keeper to securely tighten the conductor between the seat and the keeper; and
   a damper assembly at least partially positioned within the damper holder member aperture to secure the damper assembly to the damper holding portion of the body.

2. The damper clamp according to claim 1, wherein the base of the clamp assembly further comprises at least one protruding foot member configured to engage an extendible reach tool when installing the damper clamp onto the conductor.

3. The damper clamp according to claim 1, wherein the wall of the body comprises a boss extending into the conductor receiving opening of the body and the keeper comprises a notch that receives the boss such that the boss limits rotation of the keeper relative to the wall when the keeper is moving between the open and clamping positions.

4. The damper clamp according to claim 1, wherein the keeper comprises a pressure plate and a stem bracket extending from the pressure plate.

5. The damper clamp according to claim 4, wherein the wall of the body comprises a bracket receiving channel and the stem bracket is configured to fit within the bracket receiving channel such that the pressure plate limits rotation of the keeper relative to the wall when the keeper is moving between the open and clamping positions.

6. The damper clamp according to claim 4, wherein a distal end of the stem comprises the keeper coupling member and the stem bracket comprises a pocket, wherein the keeper coupling member is positioned within the pocket to couple the keeper to the stem.

7. The damper clamp according to claim 1, wherein a distal end of the stem comprises the keeper coupling member and the body comprises a pocket, wherein the keeper coupling member is positioned within the pocket to couple the stem to the body.

8. The damper clamp according to claim 1, wherein the keeper comprises an upper surface having a conductor receiving groove that contacts the conductor when the keeper contacts the conductor.

9. The damper clamp according to claim 1, wherein the seat is arcuate in shaped and configured to receive a portion of the conductor.

10. The damper clamp according to claim 1, wherein the damper assembly comprises a weight holding member secured to the damper holding portion of the body and at least one damper weight secured to the weight holding member.

11. A damper clamp comprising a body having a conductor holding portion and a damper holding portion having a damper holder member with an aperture used to secure a damper assembly to the damper holding portion, the conductor holding portion comprising:
    a base having a stem receiving aperture, a seat and a wall between the base and the seat, wherein the base, seat and wall define a conductor receiving opening, and wherein a center of the seat is vertically in-line with and vertically parallel to a center of the damper holder member aperture;
    a keeper within the conductor receiving opening and moveable between an open position permitting a conductor to be received within the conductor receiving opening and a clamping position where the conductor is clamped between the seat and an upper surface of the keeper, the keeper having a stem bracket;
    a stem extending through the base into the conductor receiving opening and having a keeper coupling member coupled to the keeper so that the stem is rotatable relative to the keeper;
    a spring around the stem between the keeper and the base to normally bias the keeper toward the clamping position to at least temporarily hold a conductor between the keeper and the body;
    wherein when the keeper is in the clamping position rotational movement of the stem is translated to linear movement of the keeper to clamp the conductor between the keeper and the seat.

12. The damper clamp according to claim 11, wherein the damper holding portion comprises a damper bracket having a damper holder member, and wherein the damper holder member is aligned with the conductor receiving opening such that when the damper clamp is installed on the conductor a center of gravity of the damper clamp is such that a damper assembly secured to the damper holder member remains below the conductor receiving opening.

13. The damper clamp according to claim 11, further comprising a damper assembly secured to the damper holding portion of the body.

14. The damper clamp according to claim 11, wherein the damper assembly comprises a weight holding member secured to the damper holding portion of the body and at least one damper weight secured to the weight holding member.

15. The damper according to claim 11, wherein the keeper comprises a pressure plate and a stem bracket extending from the pressure plate.

16. The damper according to claim 15, wherein the wall comprises a bracket receiving channel and the stem bracket is configured to fit within the bracket receiving channel such that the pressure plate limits rotation of the keeper relative to the wall when the keeper is moving between the open and clamping positions.

17. The damper according to claim 15, wherein a distal end of the stem comprises the keeper coupling member and the stem bracket comprises a pocket, wherein the keeper coupling member is positioned within the pocket to couple the keeper to the stem.

18. The damper according to claim 15, wherein a distal end of the stem comprises a keeper coupling member and the conductor holding portion comprises a pocket, wherein the keeper coupling member is positioned within the pocket to couple the stem to the conductor holding portion.

19. A damper clamp comprising:
  a clamp assembly comprising:
    a body defining a conductor holding portion and a damper holding portion, wherein the conductor holding portion comprises a base having a stem receiving aperture, a seat and a wall between the base and the seat, wherein the base, seat and wall define a conductor receiving opening, and wherein the damper holding portion includes a lead-in portion and a damper holder member, the lead-in portion extending from the base at an angle relative to the base such that a surface of the lead-in portion is positioned to guide a conductor into the conductor receiving opening, the damper holder member extending from the lead-in portion and includes an aperture that is positioned so that a center of the aperture is vertically in-line with and vertically parallel to a center of the seat;
    a keeper having a pressure plate and a stem bracket extending from the pressure plate, the keeper being movable between an open position permitting a conductor to be received within the conductor receiving opening and a clamping position where the conductor is clamped between the seat and the pressure plate;
    a stem extending through the stem receiving aperture in the base and having a keeper coupling member at a first end of the stem coupled to the stem bracket or the body;
    a spring around the stem between the keeper and the base to normally bias the keeper toward the clamping position to at least temporarily hold the conductor positioned between the seat and the keeper;
    wherein when the keeper is in the clamping position rotational movement of the stem is translated to linear movement of the keeper to securely tighten the conductor between the seat and the keeper; and
    a damper assembly at least partially positioned within the damper holder member aperture to secure the damper assembly to the damper holding portion of the body.

20. The damper according to claim 19, wherein the wall of the body comprises a boss extending into the conductor receiving opening of the body and the pressure plate comprises a notch that receives the boss such that the boss limits rotation of the keeper relative to the wall when the keeper is moving between the open and clamping positions.

21. The damper according to claim 19, wherein the wall of the body comprises a bracket receiving channel and the stem bracket is configured to fit within the bracket receiving channel such that the pressure plate limits rotation of the keeper relative to the wall when the keeper is moving between the open and clamping positions.

22. The damper according to claim 19, wherein a distal end of the stem comprises a keeper coupling member and the stem bracket comprises a pocket, and wherein the keeper coupling member is positioned within the pocket to couple the keeper to the stem.

23. The damper according to claim 19, wherein a distal end of the stem comprises a keeper coupling member and the body comprises a pocket, and wherein the keeper coupling member is positioned within the pocket to couple the stem to the body.

24. The damper according to claim 19, wherein the pressure plate comprises an upper surface having a conductor receiving groove that contacts the conductor when the keeper contacts the conductor.

25. The damper clamp according to claim 19, wherein the damper assembly comprises a weight holding member secured to the damper holding portion of the body and at least one damper weight secured to the weight holding member.

* * * * *